(12) United States Patent
Ballard et al.

(10) Patent No.: US 11,383,436 B2
(45) Date of Patent: Jul. 12, 2022

(54) SYSTEM AND METHOD FOR DEPLOYING, HARVESTING, AND IN-SITU THREE-DIMENSIONAL PRINTING OF STRUCTURES IN AN EXTRATERRESTRIAL, ENVIRONMENT

(71) Applicant: Icon Technology, Inc., Austin, TX (US)

(72) Inventors: Jason D. Ballard, Austin, TX (US); Michael McDaniel, Austin, TX (US); Evan Jensen, Austin, TX (US); Alex LeRoux, Austin, TX (US)

(73) Assignee: ICON TECHNOLOGY, INC., Austin, TX (US)

( * ) Notice: Subject to any disclaimer, the term of this patent is extended or adjusted under 35 U.S.C. 154(b) by 0 days.

(21) Appl. No.: 17/308,667

(22) Filed: May 5, 2021

(65) Prior Publication Data
US 2022/0009162 A1    Jan. 13, 2022

Related U.S. Application Data

(60) Provisional application No. 63/070,528, filed on Aug. 26, 2020, provisional application No. 63/028,728, filed on May 22, 2020.

(51) Int. Cl.
*B29C 64/165* (2017.01)
*B33Y 10/00* (2015.01)
(Continued)

(52) U.S. Cl.
CPC .......... *B29C 64/165* (2017.08); *B29C 64/209* (2017.08); *B29C 64/232* (2017.08);
(Continued)

(58) Field of Classification Search
CPC ... B29C 64/141; B29C 64/153; B29C 64/209; B29C 64/232; B29C 64/236;
(Continued)

(56) References Cited

U.S. PATENT DOCUMENTS

| 7,723,654 | B2 | 5/2010 | Taylor et al. |
| 10,052,820 | B2 | 8/2018 | Kemmer et al. |
| 10,307,970 | B2 | 6/2019 | Snyder et al. |
| 10,464,134 | B2 | 11/2019 | Khoshnevis |
| 10,793,733 | B2 | 10/2020 | Shah et al. |

(Continued)

FOREIGN PATENT DOCUMENTS

KR    10-2018-0087486    8/2018

OTHER PUBLICATIONS

Howe et al, Faxing Structures to the Moon: Freeform Additive Construction System (FACS), 2013 (Year: 2013).*

(Continued)

*Primary Examiner* — Mary Lynn F Theisen
(74) *Attorney, Agent, or Firm* — K&L Gates LLP

(57) ABSTRACT

An apparatus, system and method are provided for launching, deploying and moving mobility platforms used to produce a three-dimensional product using additive printing. The product, or object, is made by collecting materials in-situ at an off-Earth celestial body. A sintering apparatus, such as a laser, is used to consolidate the planetary regrowth into a solid object. The apparatus can receive power, and can apply heat to assist in the consolidation process. The apparatus is moveable to the build site, and includes a print head having a collector for receiving collected materials, a conditioner for sintering and heating the collected materials, and an extruder, specifically a slip form opening in which the materials can be dispersed over the surface of the extraterrestrial body where the powder form of the conditioned materials are sintered, fused, or consolidated into a hard solid bead of material.

16 Claims, 9 Drawing Sheets

(51) Int. Cl.
- *B33Y 30/00* (2015.01)
- *B29C 64/314* (2017.01)
- *B29C 64/329* (2017.01)
- *B29C 64/232* (2017.01)
- *B29C 64/209* (2017.01)
- *B29C 64/236* (2017.01)
- *B29C 64/268* (2017.01)
- *B29C 64/25* (2017.01)
- *B33Y 40/10* (2020.01)
- *B64G 1/16* (2006.01)

(52) U.S. Cl.
CPC ............ *B29C 64/236* (2017.08); *B29C 64/25* (2017.08); *B29C 64/268* (2017.08); *B29C 64/314* (2017.08); *B29C 64/329* (2017.08); *B33Y 10/00* (2014.12); *B33Y 30/00* (2014.12); *B33Y 40/10* (2020.01); *B64G 1/16* (2013.01)

(58) Field of Classification Search
CPC ..... B29C 64/25; B29C 64/264; B29C 64/268; B29C 64/314; B29C 64/329; B33Y 10/00; B33Y 30/00; B33Y 40/10
See application file for complete search history.

(56) References Cited

U.S. PATENT DOCUMENTS

| | | | |
|---|---|---|---|
| 2017/0106593 A1* | 4/2017 | Khairallah | B33Y 10/00 |
| 2017/0365365 A1 | 12/2017 | White et al. | |
| 2018/0141161 A1* | 5/2018 | Elmer | B33Y 10/00 |
| 2019/0248517 A1 | 8/2019 | Hakamada et al. | |
| 2020/0122392 A1 | 4/2020 | Townsend et al. | |
| 2020/0147884 A1 | 5/2020 | Flick et al. | |
| 2021/0086439 A1* | 3/2021 | Crothers | B29C 64/214 |
| 2022/0032500 A1* | 2/2022 | Bramberger | B33Y 30/00 |

OTHER PUBLICATIONS

Wilkinson et al., "Autonomous Additive Construction on Mars"; In: Earth & Space 2016—ASCE International Conference on Engineering, Science, Construction and Operations in Challenging Environments [online]; Jan. 2016 [Aug. 12, 2021]; Retrieved from the Internet: <URL: https://www.researchgate.net/publication/303407153_Autonomous_Additive_Construction_on_Mars>; pp. 1-11 and figures 1-6.

International Search Report and Written Opinion issued to PCT/US2021/032888, dated Sep. 13, 2021, 11 pages.

* cited by examiner

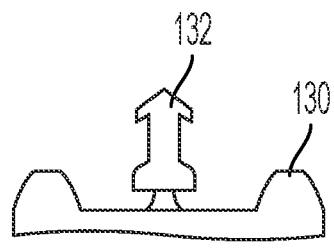 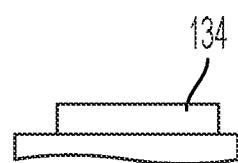 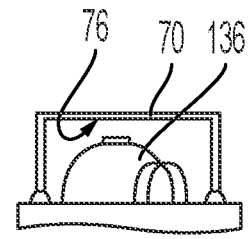
FIG. 15A   FIG. 15B   FIG. 15C
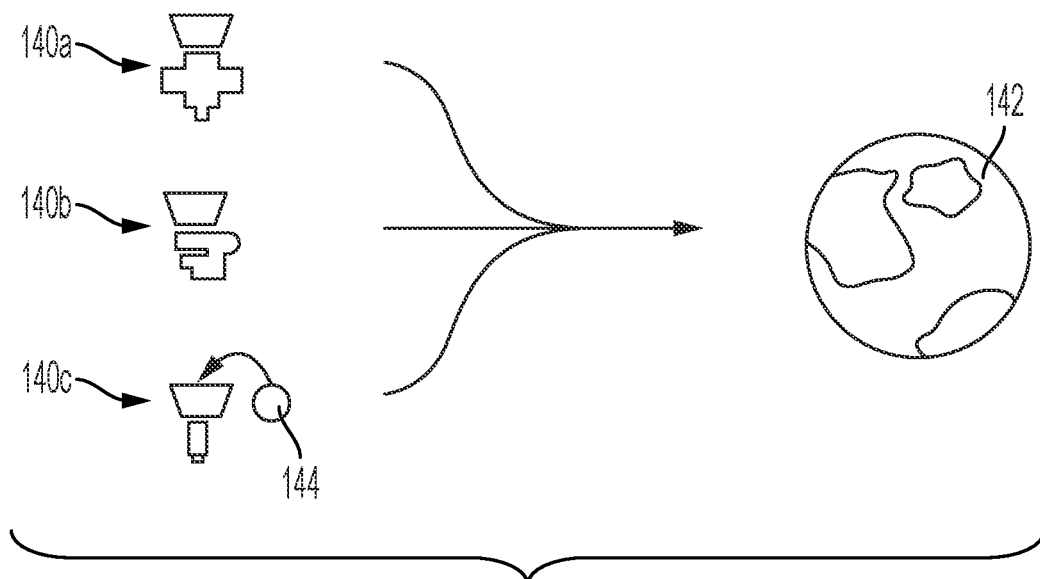
FIG. 16

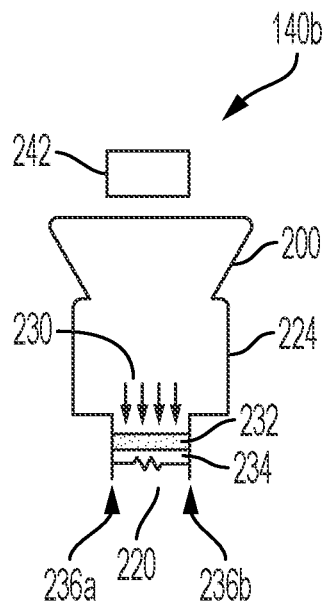 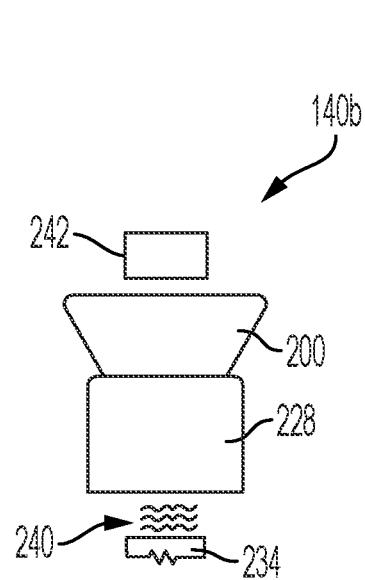 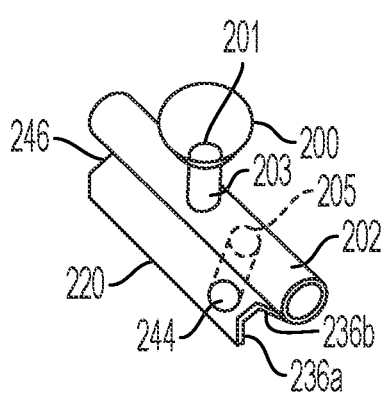
FIG. 19A    FIG. 19B    FIG. 20
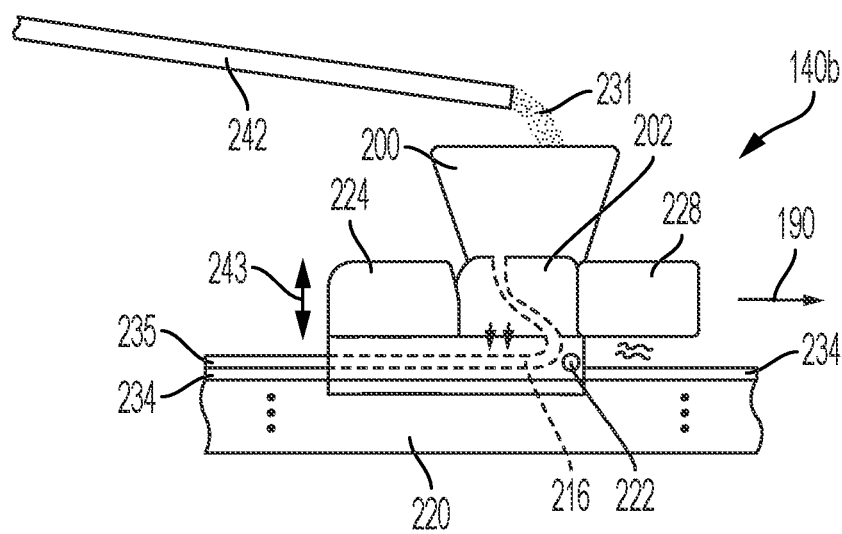
FIG. 21

SYSTEM AND METHOD FOR DEPLOYING, HARVESTING, AND IN-SITU THREE-DIMENSIONAL PRINTING OF STRUCTURES IN AN EXTRATERRESTRIAL, ENVIRONMENT

PRIORITY CLAIM

The present application is based on, claims priority from, and is a continuation of Patent Application Ser. No. 63/028,728 filed on May 22, 2020 and Patent Application Ser. No. 63/070,528 filed on Aug. 26, 2020, both disclosures of which are incorporated herein by reference in their entirety.

FIELD OF THE DISCLOSURE

The present disclosure generally relates to off-planet, or extraterrestrial, additive three-dimensional construction using harvested in-situ feedstock materials.

BACKGROUND

Construction of structures off of Earth's planet (i.e., off-planet or extraterrestrial) presents difficult challenges. Sourcing building materials is essential for off-planet operations, yet transportation of building materials from Earth to an off-planet location (i.e., to an extraterrestrial body) is prohibitively expensive, complicated, and time consuming. In addition, hauling each piece of equipment necessary for a mission from Earth to the off-planet extraterrestrial body such as the Moon, Mars, an asteroid, or other extraterrestrial body away from Earth is problematic because the launch vehicles utilized to deliver payloads to space have limited payload capacities. It is also exorbitantly expensive to launch a large payload. Despite the difficulty of transporting materials or equipment from Earth to the extraterrestrial body, conventional systems to construct structures on such a body require most if not all construction systems and materials to be brought from Earth. Moreover, in-situ materials on location of the extraterrestrial body have been studied but never fully utilized.

Developing the capability to build purpose-designed structures from in-situ materials located at the extraterrestrial body could greatly reduce the cost and increase the practicality of space exploration, research, and eventual settlement. It is not clear what should be the best approach for constructing a structure in-situ entirely from and upon an extraterrestrial body. One possibility is three-dimensional printing, also known as additive manufacturing or additive construction.

Additive manufacturing uses equipment to add layers of material to, for example, walls of the structure to form a three-dimensional unit. The equipment used in additive construction of large objects must be fairly large. Also, significant amounts of feedstock materials must be used to print a three-dimensional object. Hauling large three-dimensional (3D) additive construction systems to the extraterrestrial body poses problems, as does the delivery of feedstock materials from Earth to the extraterrestrial body.

A need exists in improving the production of a 3D object on a surface of an extraterrestrial body. That need involves minimizing the transport and deployment of an additive 3D printing apparatus. The need also involves minimizing if not eliminating the amount of feedstock material that must be transported. This background information is provided to reveal information believed by the applicant to be of possible relevance to the present disclosure. No admission is necessarily intended, nor should it be construed that any of the preceding information constitutes prior art against the present disclosure.

SUMMARY

To meet the needs noted above, the present disclosure provides a new and innovative system and method for launching and deploying a three-dimensional (3D) continuous and additive printing system on various mobility platforms. The additive construction system can be launched from Earth to an extraterrestrial body that, when deployed on the body, can remotely control the mobility platform and also any and all print mechanisms mounted to that platform. Therefore, additive 3D construction can occur from a mission controller situated, for example, on Earth. It is not necessary that the construction system used for 3D printing maintain manned operation on the extraterrestrial body.

According to the present disclosure, the mobility platform can be readily configured in a launch mode and, upon arrival on the extraterrestrial body, the mobility platform can be thereafter configured remotely into a print mode configuration. The print mechanism, or print head, can be designed to receive materials that are gathered in-situ exclusively from the extraterrestrial body. Some of such materials can be byproducts of the space flight, for example. All materials used by the print head can nonetheless be gathered exclusively from the extraterrestrial body. According to another embodiment, the majority, and preferably greater than 97% of the materials are harvested from what is present in its native form on the extraterrestrial body, with the remainder being either byproducts of the flight or landing materials, or transported to the body.

The harvesting and use of materials (e.g. regolith, soil, dust, minerals, ores, ice, dirt and possibly water extracted from the extraterrestrial body, etc.) is useful because it will reduce mass and payload space. In order for those materials to be utilized, however, they must be conditioned for possible multiple applications. Use applications include the common uses needed for space exploration, most if not all of which is gathered from space or the extraterrestrial body. Such applications can include objects formed by continuous, 3D additive manufacturing to build an object that can be coupled to another object to form an overall structure. Such objects or larger connective objects include a shelter, a habitat, launch or landing pads, spacecraft parts, roads, berms, or portions thereof.

In the additive manufacturing process, the material being conditioned must be somewhat small relative to the end product being produced. Therefore, certain processing and sorting of the collected, or harvested material must be undertaken. A conditioning device can physically or chemically modify the locally-sourced, in-situ material into a usable form. For example, feedstock material (e.g., a concrete-like composite, a powder of metal alloy, or a spool of polymer) may be created from the conditioned material. The feedstock material is created in layers or slices, as beads of material used to produce a desired, additively constructed object in 3D.

According to one embodiment, a system is provided for in-situ production of a 3D object on a surface of an extraterrestrial body. The system includes a transceiver located on the extraterrestrial body for receiving control information from a mission controller located on Earth, and sending status information back to the mission controller. A collector can be used and coupled to the transceiver for collecting the materials from the surface of the extraterrestrial body. A conditioner can be coupled to the collector for sintering and heating the collected materials. An extruder can be coupled to the conditioner for placing the conditioned materials over a surface of the extraterrestrial body as directed by the control information received from the mission controller.

According to one embodiment, the collector can comprise a hopper for receiving the materials, and an auger for applying a layer of the materials emitted from the hopper upon a pre-existing bead formed over the surface of the extraterrestrial body. A slip form can be provided with an upper surface extending above the applied layer of materials and having parallel opposed lateral surfaces spaced from each other substantially equal to a width of the pre-existing bead. The lateral surfaces preferably extend below a portion of the pre-existing bead to assist in maintaining the applied layer of deposited material on the upper surface of the pre-existing bead as it is being sintered by the conditioner. An opening can exist within the upper planar surface of the slip form that operates as the extruder. As the layer of deposited materials extend downward through the extruder opening of the slip form, where a sintering laser emitter has its output configured upon the applied layer of material for sintering across the width of that layer to fuse the loose powder particles into a solid mass. Fusion occurs by applying laser-directed heat without melting the powder to a point of liquefaction. The particles in the loose powder can be polymeric or metallic. Depending on the size of the object being printed, and the availability of certain polymers needed to be imported from Earth, it may be preferred that the particles in the material being sintered be derived solely as metallic particles obtained solely from the surface of the extraterrestrial body. If the 3D object is quite large, such as a habitat, then the materials being deposited can be obtained from the space mission or landing or transported to the body. However, as will be noted below, the percentage obtained from the mission or landing or transported to the object is nonetheless less than 3% of the overall native collected material regardless of whether the 3D object is extremely large.

According to another embodiment, a system is provided for in-situ production of a 3D object on a surface of an extraterrestrial body. The system can include a mobility platform including wheels configured to move the mobility platform along the surface of the extraterrestrial body. The system can further include a print head coupled to the mobility platform and configured to move in x, y and z directions. A hopper can be arranged on the print head and can comprise a conical shaped inner surface that radially surrounds a hopper central axis. The hopper central axis extending in the z direction, preferably vertical. The hopper can include a hopper opening at a lower portion of the hopper for funneling materials harvested from the extraterrestrial body.

Also included with the print head can be an ager having an auger housing and an auger shaft configured to rotate within the auger housing. The auger shaft can have a central axis that extends either in the x or the y direction (or along the x/y plane at angles between the orthogonal x and y directions) depending upon the direction in which the print head is moving across a pre-existing bead. A slip form can be coupled below the auger, and can comprise an upper planar member having a slip form opening in that upper planar member. The slip form opening operates as an extruder that is aligned directly below the lower auger housing opening to apply a layer of materials emitted from the hopper in powder form. The slip form opening receives the powder via the auger upon the pre-existing bead formed over or above a surface of the extraterrestrial body. Parallel, opposed lateral planar members of the slip form are spaced from each other and extend downward from the upper planar member substantially equal to a width of the pre-existing bead. The opposed lateral planar members extend at equal lengths below a portion of the pre-existing bead. A sintering laser emitter is coupled between the auger housing and the slip form for sintering across the width of the applied layer of materials to additively deposit and sinter layers of material in the x, y and z directions, or at directions between the x and y axes within vertically stacked layers within the x/y plane.

According to yet another embodiment of the present disclosure, the mobility platform can comprise a gantry on which the print head is coupled for movement between vertical towers that extend in the z direction, and which move upon the wheels of the mobility platform in the x/y plane. The mobility platform can, alternatively, comprise a set of cables on which the print head is coupled for movement between vertical towers that extend in the z direction, and which move upon the wheels of the mobility platform in the x and y directions. According to yet a further embodiment, a gantry can be coupled to a single vertical tower, such as a moveable platform, wherein the print head is mounted to a distal end of the gantry with a single vertical tower that extends in the z direction. The mobility platform can, alternatively, comprise a reciprocating arm with a proximal and a distal end. The print head can be coupled to the distal end, and both the proximal and distal ends can move in the x, y and z directions. Alternatively, the mobility platform can comprise a rover having a bed for receiving the harvested materials. The rover can comprise an opening within the bed for delivering the harvested materials to, for example, the hopper of the collector.

According to still a further embodiment of the present disclosure, a method is provided for in-situ production of a 3D object on a surface of an extraterrestrial body. The method comprises heating a bead of sintered material exclusively and solely obtained from the extraterrestrial body. Thereafter, a layer of material is applied upon the heated bead, and thereafter, the layer of applied material is sintered across the entire width of the heated bead. Heating, applying, and sintering can be repeated in similar order across additive slices or layers of the object formed in 3D.

The present disclosure thereby provides new and innovative concepts for deploying equipment to an extraterrestrial body, along with harvesting and use of materials available in-situ on that extraterrestrial body, and the manufacturing of an object at the local extraterrestrial body. Feedstock material is created suitable for utilization by an additive manufacturing apparatus, whereby the feedstock material is collected and conditioned solely from native materials on the body. The raw in-situ materials are gathered, and the collected materials are processed, or conditioned, in order to identify and create materials suitable for use by the additive manufacturing apparatus. The created feedstock material is prepared to certain shapes and sizes, 3D applied by the additive construction equipment in an extraterrestrial environment deployed from Earth.

BRIEF DESCRIPTION OF THE DRAWINGS

The drawings are of illustrative embodiments. They do not illustrate all embodiments. Other embodiments may be used in addition or instead. Details that may be apparent or unnecessary may be omitted to save space or for more effective illustration. Some embodiments may be practiced with additional components or steps and/or without all of the components or steps that are illustrated. When the same numeral appears in different drawings, it refers to the same or like component or steps. The features and advantages of the present disclosure will become more apparent from the Detailed Description set forth below when taken in conjunction with the drawings.

FIGS. 15a, 15b and 15c illustrate different form factors, or objects, constructed from 3D additive construction processes on the extraterrestrial body according to one embodiment;

FIG. 16 illustrates different material deposition 3D systems with different print heads transported to and deployed onto an extraterrestrial body according to one embodiment;

FIGS. 19A and 19B are back and front views, respectively, of the print head apparatus of FIG. 18, illustrating the sintering across the width of the layer of powder applied onto a pre-existing bead and a microwave pre-heater that applies thermal energy to the pre-existing bead;

FIG. 20 is a top view of the print head apparatus of FIG. 18, illustrating the hopper, auger housing and slip form with opening to apply the layer of powder onto the pre-existing bead; and FIG. 21 is a side view of the print head apparatus of FIG. 18, illustrating a material conveyance feeder, the hopper, the front-side microwave pre-heater, and the sintering laser applied to the material contained within the slip form.

DETAILED DESCRIPTION

Figure 1:
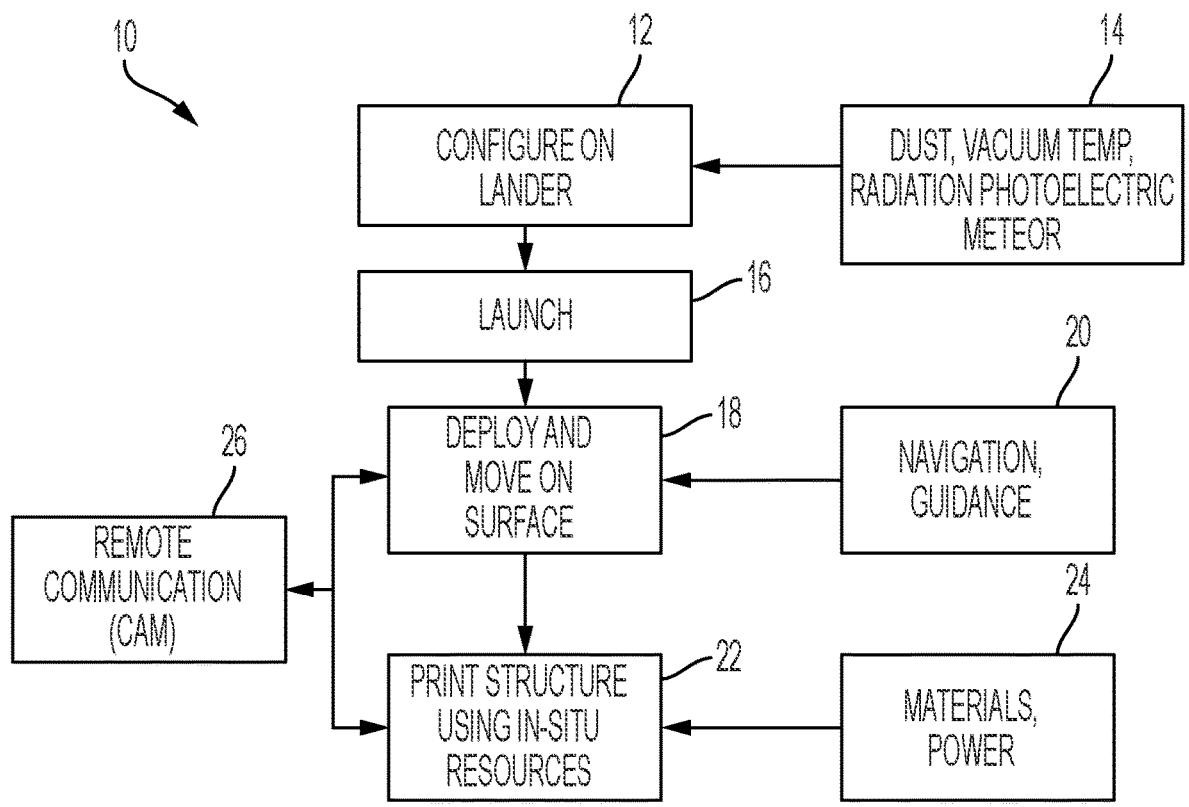
FIG. 1 is a combination flow and block diagram of a process sequence of loading, launching and deploying a 3D, additive construction apparatus to and on an extraterrestrial body according to one embodiment.

It should be understood at the outset that, although illustrative implementations of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

From the description provided herein, those skilled in the art are readily able to combine software with appropriate general-purpose or special-purpose computer hardware to create a computer system and/or computer subcomponents in accordance with the various embodiments and methods.

While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

Extraterrestrial bodies, and in particular the Moon, may be the first off-Earth site for extended manned missions. Such bodies afford a possibility for human kind's first permanent occupation of another world. To enable such lunar occupation, robust structures will need to be built on the extraterrestrial body that provide better thermal, radiation, and micrometeorite protection than existing metal or inflatable habitats can provide. In addition to habitats, additional structures such as launch/landing pads, launch/landing pad debris shields, equipment shelters, roads, heat accumulation blocks, and other space specific extraterrestrial application projects are of high priority for future missions.

There may be several factors to consider when evaluating extraterrestrial construction using 3D printing. The viability of any approach to 3D printing for construction on the body depends on the below mentioned factors, beginning with extraterrestrial surface environmental factors. The surface is oftentimes in a hard-vacuum, high radiation environment with a constant barrage of high velocity micrometeorites and temperatures ranging from just above absolute zero to nearly boiling. For instance, water and most conventional fluids sublimate on the Moon. Selenographic range of operations such as regional, topographic, or seasonal restrictions to an approach decreases value.

The large number of meteorites that strike the moon can exceed approximately 180 meteorites each year, some of which can be quite large in mass and dimension. Meteorites can prove hazardous to man and material, as well as the apparatus used to harvest the materials from the surface, and to thereafter process or condition the materials before constructing an object on the extraterrestrial body. In addition, there can be a significant number of quakes each year, some can exceed 5.5 Richter. Solar storms can also occur that increase radiation levels harmful to humans and electronic equipment. Proper shielding must be in place not only on the mobility platform but also at the site in which the print head is operating. As will be noted below, a slip form can provide shielding at the print site to withstand the extreme temperature, radiation, moonquakes, dust storms, and meteor showers that can occur almost every day on the extraterrestrial body.

Another factor is the construction equipment itself, beginning with the mobility platform and the equipment used to move the mobility platform and the print head coupled to the platform. Dependence on human labor (or any human involvement) on the extraterrestrial body decreases value. A desirable feature of a 3D printing mobility platform is suitability for construction on other planets, satellites, and bodies. Weight of equipment to be launched and launch costs must be considered. Launch cost is proportional to weight. Satisfaction of other launch payload requirements, where only equipment that meet payload constraints (mass, volume, etc.) should be considered. Simplicity of mechanical design for the mobility platform, and operation of that platform, is also important. Simplicity decreases cost and risk of printing error or failure.

Another factor is the dependence on available power at the extraterrestrial surface. The mobility platform and the print head operation are reliant on sufficient power, and the application of that power at the proper moment to the print head in a three dimensional space at the proper position above the object being printed. Power must be sufficient to overcome and compensate for solar winds, radiation effects, moonquakes, dust storms, etc. The construction system (mobility platform and print head) must have a flight configuration that is within the specification of the lunar lander. In some instances, the construction system must be rearranged or reconfigured for takeoff versus landing and deployment thereof. The construction system must also be able to communicate with operators on Earth, while in orbit or on the extraterrestrial surface. The construction system must also be able to move across the surface without tipping, with or without a human on board. Preferably without a human or board. The construction system must also be able to construct multiple types of object form factors, or applications, including landing pads, berms, roads, walls and other habitat objects.

Another factor involves choosing the appropriate material, preferably exclusively on the site, or in-situ. Depending on the size of the ensuing object, the 97% to 100% of harvested materials used to make the objective are native to the extraterrestrial body, and are present only on the body. A low thermal conductivity material helps make objects insulated and increases their value. A high heat capacity improves the ability of the structure to moderate the temperature extremes of the lunar surface. Radiation shielding capacity of the printed material also increases value, although sufficient strength to allow complete or partial burying within the surface extracted material could also achieve similar positive ends. Durability of the printed material involves resistance to degradation over time from extreme temperatures, temperature cycling, solar/cosmic radiation, and micrometeorites/meteorites increases value. Also, high compressive, flexural, and tensile strength, etc. is essential. Lower gravity on the certain planets such as the Moon translates to lower ($\sim\frac{1}{6}$ of) strength requirements than on Earth. However, structural demands may be proportionally higher to achieve adequate radiation shielding. Also, due to the necessity of internal pressurization, the primary forces may be in the opposite direction to those experienced at standard temperature and pressure of the Earth. Also, safety of printed material must be considered, such as toxic outgassing, byproducts, dust, particulates, and flammability decrease value. Seismic performance of printed material must also be considered. For example, the Moon experiences frequent seismic activity. Using byproducts obtained from the launch or gathered from space should be avoided. For extremely large objects, possibly up to 3% byproducts can be used. Any amount of byproducts, or materials transported to the body, that exceed 3% proves too costly and is infeasible for effective in-situ 3D object production.

Thus, a significant factor in any construction project on the extraterrestrial body is materials used in manufacturing a 3D object should be obtained in-situ. Any limitations in the chemical and physical properties of harvested, in-situ input material decrease its value. Reliance on scarce, valuable, or depletable in-situ materials or resources (e.g., water or particular minerals) should be avoided. Water is generally not available on the surface, and it can be cost prohibitive to bring water from Earth. Even if the resource is widely distributed, such reliance increases cost and decreases sustainability and efficiency. Simplicity of material extraction/harvesting, collection, and conditioning/processing decreases cost and risk of construction error or failure.

Dependence on significant technologies that have not yet been developed for or demonstrated on the extraterrestrial body (e.g., refining of and chemical synthesis with materials) should be avoided. Absent knowledge of these materials or how to refine them increases uncertainty and time to implementation. Amount of supply/resupply of materials needed from Earth increases costs and decreases efficiency and sustainability of 3D printing dramatically. For large scale applications, with large form factor objects, materials cannot be brought from Earth and substantially all feedstock materials must be gathered at the construction site, or in-situ. Dependence on material or reagent storage structures such as tanks, hoppers, bags, etc. increase cost and complexity. Dependence on preparatory missions (e.g., for prospecting, mining, refining, or chemical synthesis) also increases costs, time, and risk of failure. Many or all of the preparatory activities might not be possible without prior construction, creating paradoxes.

There may be four general approaches to extraterrestrial 3D additive printing. For example, 3D additive printing includes extrusion, fused deposition, binder jetting, and powder bed fusion. These approaches remain at very early stages of development. Consequently, it is difficult to evaluate any approach with respect to all or most of the previously listed factors. The focus is instead on prominent shortcomings to eliminate the least promising technologies to focus on the most viable ones.

In essentially all extraterrestrial 3D printing proposals to date, in-situ use of feedstock material are based on regolith simulant and other minerals and ores believed present on the extraterrestrial surface. The simulants are based on volcanic rocks and soils found on Earth that are similar to regolith, minerals, ores, dust, dirt, ice, water on the body in many, but not all, aspects. Most of the 3D printing proposals have attempted to replicate the regolith, but it is very difficult to ascertain the actual fidelity of material simulants to the genuine article, and the issues of dust and regolith are likely to be substantial. Unless noted otherwise, most researchers conducted their experiments in ambient Earth conditions (in air, under normal Earth atmospheric pressure and gravity).

Extraterrestrial 3D printing using extrusion involves creating a viscous fluid that is pumped through a nozzle to print beads of material in layers that harden after deposition. Extrusion of concrete is the predominant approach to 3D printing for construction on Earth, although foams and other polymers have also been used. Combining polymer resins (e.g., 45 to 70% by weight) with regolith, and exposure of the mix to ultraviolet light to liquify the resins and produce a slurry is one approach. Printed small objects and sintering them (heated short of melting) can occur. The slurry can be very printable and the printed objects can be very strong. However, this method relies (as several others do) on a substantial portion of imported materials. Building large habitats on the body proves infeasible using polymer resins.

Small objects can be printed with an ink made up of a polymer (e.g., 15% by weight), solvents, and regolith. The polymer could be synthesized from components excreted in residents' urine. However, the amounts synthesized would be grossly inadequate for construction of large scale projects, and the urine itself would almost certainly be needed for other critical uses, such as composting/crop fertilization and water recovery. Moreover, much, if not most, construction on the extraterrestrial body should occur without humans on-site.

The regolith can be mixed with a binder solution (e.g., 6% by weight) composed of imported chemicals and minerals (e.g., 2%) and water (e.g., 4%). Cast and compacted samples of this combination can have good compressive strength and radiation shielding performance under Earth conditions, but poor strength when produced in extraterrestrial heat and vacuum conditions. A somewhat similar process can be undertaken with a binder solution (e.g., 43% by weight) composed of imported chemicals (e.g., 11%) and water (e.g., 32%). The extruded material can be sintered to finish printing small objects. The water for these printing methods would need to be imported or possibly mined from permanently shadowed craters at the body's poles. However, much like the human byproduct (i.e., urine or plastic waste) approach, water resources are likely to be among the most valuable on the extraterrestrial body and have much higher demand for use in life support, rocket propellant, small-scale agriculture, and economic activity.

A mobile robotic printer can be developed with a mixing and extruding assembly to print sulfur concrete. Sulfur is believed to be present on most extraterrestrial bodies, but in small quantities. Sulfur can serve as the cementitious binder (e.g., 30 to 35% by weight) of regolith. Small walls of an object can be printed. The sulfur would need to be imported or mined and refined on the body, as it is present in the regolith in low (e.g., <0.3% by weight) concentrations. However, sulfur in concrete sublimates rapidly in a vacuum at temperatures that occur commonly in the equatorial regions (including all manned Apollo landing sites on the Moon). Temperature cycling involving cooler temperatures typical of many off-planet extraterrestrial regions also produces severe cracks in sulfur concrete. In short, sulfur concrete is not a durable building material for the many extraterrestrial regions.

Fused deposition modeling is similar to extrusion. Typically, it involves heating a solid filament and then extruding the viscous melted material. For example, heating mixtures of a polymer (e.g., 70 to 95% by weight) and regolith may advantageously create filaments that can then further be heated and extruded for printing small objects. The polymers in this approach would need to be imported from Earth, which is a significant problem for large scale 3D objects.

A 3D printer can be implemented to combine polymer binder (e.g., polyethylene variants; 15% by weight) and regolith, heat the mixture, and extrude it. This approach can effectively have "zero launch mass" for materials based on the assumption that the polyethylene binder would be sourced from mission plastic trash or synthesized from unspecified space resources. Given that most missions should be unmanned, human discarded plastic may be nonexistent. Nonetheless, if plastic trash is present, such plastic almost certainly would be greatly insufficient for the amounts of polyethylene needed for large scale objects. Also, plastic recycling is often a "down-cycling" event in which the product is of inferior quality to the original. Imported trash or polyethylene binder would not be a sustainable resource and might be necessary instead for recycling into other, smaller objects. Imagining plastic waste and recycling on the scale necessary to build a single sizable building, much less an entire mission base infrastructure stretches the imagination beyond rationality. Moreover, much if not most of the construction on the body may well need to occur in the absence of concurrent manned missions. Under space gravity in parabolic flights, researchers have printed small objects with fused deposition modeling successfully, albeit without regolith as a component material.

Binder jetting involves spraying a liquid on a powdered layer according to a building plan. The wetting activates a binding reaction. By adding additional layers of powder and spraying them, the 3D print head gradually builds the structure. To prevent evaporation of the water on the extraterrestrial body, water (e.g., 5% by weight) can be injected into layers of the regolith mixed with other chemicals and minerals (e.g., 1.5% by weight). Samples can be printed in a vacuum successfully and observed no evaporation. Benchtop size structures can be constructed, and large (e.g., 1.3 tons) structural elements can be constructed under ambient Earth conditions. A closed cell wall design can be used in which a printed honeycomb encloses pores of loose regolith. This design allows for efficient use of printed materials and also provides good protection against meteorites and solar/cosmic radiation. It is estimated that 3,800 kilograms of imported dry chemicals and minerals may be required to print a habitat of approximately 1,000 square feet at a delivery cost of $839 million (under assumption of transportation costs of $221,000 per kilogram). This amount of material is much less than that for other approaches that are reliant on imported material. Furthermore, an assumption is made that the water for printing would be extracted from the extraterrestrial body, and such water may not be present, or only available in permanently shadowed craters at the poles. The shortcomings of any water-reliant construction system thereby essentially eliminates such systems from consideration.

Powder bed fusion and sintering is much more promising. Powder bed fusion involves sintering or melting a powder and building up the planned object in 3D as successive layers of powder are fused. Sintering entails heating a powder short of total melting. Sintering can be performed by a laser or by microwave.

Sintering can bind the powder particulate material together into a coherent solid even when the heat applied is below the powdered material's melting temperature. In other cases, sintering seems to melt just the surfaces of the powder particles. Powder bed fusion may be the most viable of the options disclosed herein. Namely, this approach requires no imported material whatsoever (i.e., can be obtained exclusively—100% from native feedstock materials) and does not suffer from any of the other flaws of the aforementioned approaches. The three main modalities used for sintering and melting in prototypes of lunar 3D printers are lasers, concentrated sunlight, and microwaves.

Benchtop-scale structures can occur by sintering or melting regolith with lasers. The objects printed with laser melting can be brittle or have small cracks. Samples have moderate compressive strength (similar to masonry brick, after accounting for lower gravity on the extraterrestrial body) and high flexural strength (greater than that for "residential concrete"). The design of a fully automated 3D printing system, including robots for excavation/harvesting, material transport, material conditioning, and printing by laser sintering is an embodiment hereof. Any manned involvement occurs from mission control on Earth, with the mobility platform and print head controlled by a transceiver located on the extraterrestrial body.

Small samples are shown to be printed by concentrating sunlight or simulated sunlight with Fresnel lenses and/or mirrors on the extraterrestrial body harvested materials, which include regolith, minerals, ores, dirt or dust. When printed under ambient Earth conditions, the printed samples had poor structural strength. However, samples printed in a low vacuum achieves a more beneficial result. Compacting printed material after adding a layer of powder and decreasing the interval between deposition of layers enhances the structural integrity. Components of an extraterrestrial sintering 3D printing system, including conveyer, feeder/hopper, spreader/auger, print bed with slip form shaping, pre heater, powder sintering laser, and software control are utilized entirely from in-situ materials. Sintering from a solar power source requires very little power for operation. However, a solar sintering 3D printer might require continuous maintenance to clean mirrors and lenses as well as shielding to protect mirrors and lenses from micrometeorites.

Sintering regolith can also occur through use of microwaves in small furnaces. Microwave sintering in a furnace can be quite effective with harvested material, perhaps because of the presence of nanophase iron ore in the regolith. Samples of microwave-sintered lunar regolith simulants can have moderate to good compressive strength. A fully operational robotic rover and a microwave sintering system for 3D printing is provided that focuses energy on a single hotspot and measures the material's surface temperature and phase changes. The microwave can be used as a pre heater on a pre-existing fused powder bed of material before applying another layer to be sintered by a sintering laser. Microwave sintering is valid for heating of various regoliths as will be described more fully below.

The most notable drawback of the sintering approach is the power requirement (solar sintering excepted). Laser and microwave sintering/melting approaches likely would require fission nuclear power, a tremendously large solar array, an in-situ lunar power utility, or some other power source on the extraterrestrial body. Microwave sintering uses only 2 to 3% of the energy that laser sintering uses. Sintering and melting approaches also can produce useful byproducts, such as oxygen, hydrogen, and metal alloys.

The developments in extraterrestrial construction processes utilizing existing additive manufacturing technologies are challenging. Extrusion, fused deposition modeling, and binder jetting on the body all involve importing a fraction of materials for printing (e.g., 6 to 95% by weight) from Earth and/or establishing industrial activities of unknown viability on the Moon in advance missions to obtain necessary materials for construction. All but the smallest proportions of imported material are very unlikely to be economically feasible, probably rendering these three approaches not viable. Further analysis is needed to compare the cost of transportation with the cost of extraction and processing on the surface to decide with confidence.

Printed components may comprise only part of buildings on the extraterrestrial body, as those to be occupied by humans would require internal structures, shells/skins, entry/exit ways/airlocks, accessories, and furnishings that almost certainly would need to be imported. However, this would be true for nearly all approaches to lunar surface construction. Thus, even apart from 3D printing equipment and materials, the launch costs for large scale construction are substantial.

All 3D printing equipment must be hardened and ruggedized to operate in the extraterrestrial environment (temperature extremes, temperature cycling, radiation, micrometeorites, dust, surface reactivity/triboelectric charging, etc.). In planetary environments characterized for their vacuum conditions, very high temperature gradients, and significant electrostatic charging is a major engineering challenge. In terrestrial conditions, soil handling equipment display some of the highest failure rates and maintenance costs per operational hour among industrial processes in spite of a long history of practice and knowledge of soils. Minimizing the agitation of lunar dust in all operations will be necessary and may require different construction tactics.

On the Moon, mobile-robot energetics favor creeping speeds and 'shaving' excavation—different from the terrestrial construction paradigm. Actuators must be electric, and mobile power must be either regenerable (onboard batteries or fuel cells) or beamed in. In addition, regolith below 20 cm depth is naturally highly compacted. So, heavy work (e.g., grading, mining, habitat complex construction) should use creeping speeds (from 30 cm/s down to barely perceptible motion). Albeit too slow for human operators, this speed regime is highly amenable to robotic control. The terrestrial earthmoving paradigm (e.g., diesel-powered, hydraulics-actuated front-end loaders) does not fit native or engineered conditions. Shaving excavation, albeit perhaps mesmerizing to watch, is deterministic and supports a timeline consistent with an affordable early landing rate. Employing modular swarms of small robots might mitigate somewhat this slower pace of construction for individual components of a printing system, but might negatively increase lunar dust agitation.

A somewhat narrower challenge is operating a lunar 3D printing system in a fully autonomous fashion. This has yet to be implemented on Earth for the whole set of tasks involved with a construction project. The most formidable obstacle to developing an effective 3D printing system is the inability to test prototypes in all extraterrestrial conditions. It is difficult to simulate on Earth, in parabolic flights, or in Earth orbit all of the conditions on the Moon critical to 3D printing. Compared to objects sintered in ambient conditions on Earth, objects sintered in microgravity can be more porous, less dense, weaker, and more distorted.

A particularly critical deficiency for research and development is the lack of real regolith, with its unique characteristics that have not been simulated fully, including presence of nanophase iron, elongated/rugged particle shapes, and electrostatic properties. Adding nanophase iron to lunar regolith simulant is advantageous to evaluate microwave sintering with just such a simulant. Without a large supply of real lunar regolith for testing, all further research and technological development has a significant risk of ultimately being irrelevant and/or infeasible. Consequently, developing an effective construction technology platform for the body is based on what is believed present on such bodies, including the appropriate material and mineral concentrations for effective laser sintering and microwave heating needed to construct a large scale object.

Most approaches to extraterrestrial 3D printing therefore depend on, as part of one embodiment hereof, sufficient power to drive the mobility platform, the sintering laser and the microwave pre heater as well as sufficient combinations of minerals for the feedstock material.

There might be other construction methods that are practical and technically feasible, such as regolith compaction (often with binders), dry mix/steam injection concrete, basalt casting, tunneling, exploiting natural caves/lava tubes, and autoclaved regolith/binder masonry bricks, among others. However, they also suffer from at least as many, if not more, practical barriers and technical uncertainties than 3D printing.

It appears, however, that powder bed fusion, or sintering, for 3D printing is readily available as the preferred solution for constructing large scale objects on the extraterrestrial body. Although this method may have the highest system energy requirements, it also has the highest percentage of in situ resource utilization, the lowest imported material requirements, the lowest cost of construction, no water requirement, is geography agnostic (doesn't have to be near relatively water-rich permanently shadowed regions), and requires little to no previously emplaced industrial processes or systems. Indeed, all materials can be gathered in situ, 100% from native non-imported material found only on the extraterrestrial body, and preferably the entire printing process is unmanned on the body.

Turning now to the drawings, FIG. 1 illustrates a flow and block diagram 10 of a process sequence of loading, launching and deploying a 3D additive construction apparatus to and on an extraterrestrial body. Initially, the lander must be configured 12 to withstand dust, vacuum, temperature, radiation, photoelectric and meteor bombardment 14. The lander can be launched from Earth 16. The lander is configured with a mobility platform suitable for additively printing a 3D object on the extraterrestrial body and, upon arrival at that body, the mobility platform is deployed for movement on the body's surface 18. The mobility platform and print movement of the print head is preferably achieved unmanned where all control and guidance occurs from a mission controller located on Earth, shown at block 20.

The printed object preferably uses only native resources found only on the body 22, and preferably feedstock materials that are conditioned using a power source 24 on the body. According to a preferred embodiment, the materials, once harvested from the planet's surface are conditioned so that the ensuing powder is of the appropriate usable form and contains the appropriate mineral composition. The feedstock material 24 is conditioned to the appropriate particulate size and made up of regolith having the appropriate minerals, and ores, including possibly nanophase iron in the appropriate percentage relative to the other minerals within the regolith. The particulate size of the materials that are conditioned is preferably less than 1000 microns in diameter, and more preferably less than 100 microns in diameter, and even more preferably less than 50 microns in diameter. In particular, the powder is a locally sourced amorphous phased lunar or extraterrestrial regolith, from either the mare or highlands regions, known for being finely ground and gardened over billions of years from micrometer impacts. The largely ceramic based material varies by region, and includes various ceramics and metals formed into basalts and anorthosites. Movement of the mobility platform, as well as the operation of the print head and print structure needed to form the 3D object occurs through remote communication using CAM software loaded onto the mobility platform controller which operates not only movement of the platform, but also the print head coupled to the platform. The remote communication 26 occurs from a mission controller on Earth. Mounted on the mobility platform, and in communication with the drive mechanisms of the mobility platform, as well as the print head, is a transceiver that receives remote communication from Earth and actuates the appropriate drive mechanism at the appropriate time and duration so that the platform itself is at the proper location and also the print head on that platform is at the proper location. The transceiver receives control information from the mission controller on Earth, and also sends back status information as to the position of the mobility platform and the print head as an acknowledgment that additive construction is occurring per the CAD and CAM software instructions.

Figure 2:
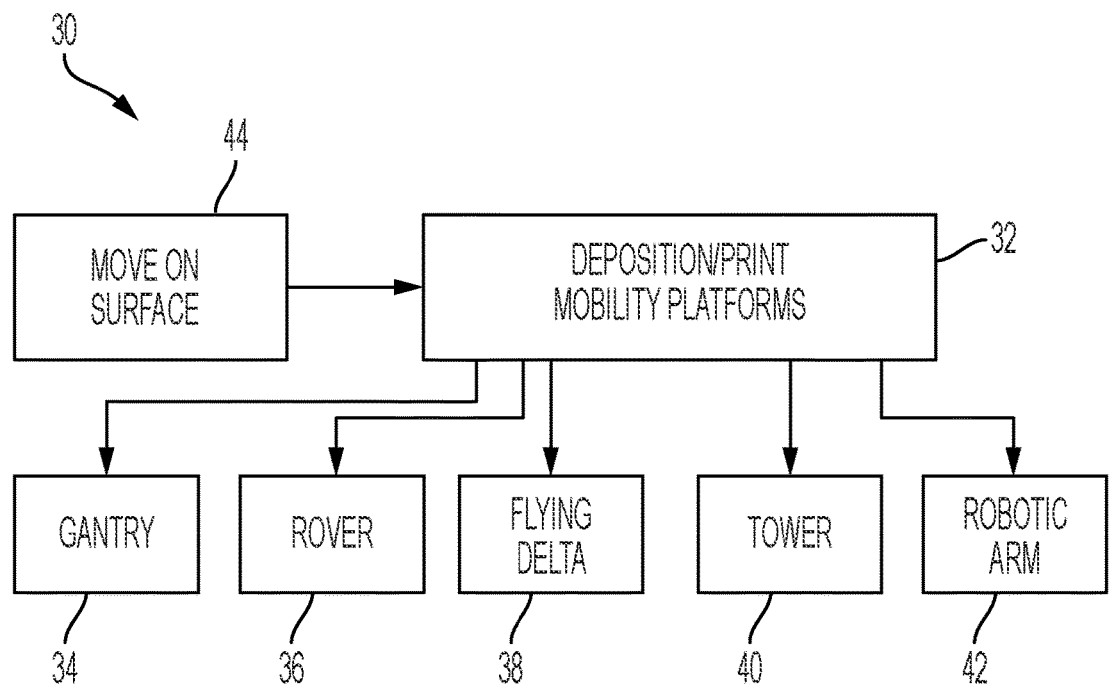
FIG. 2 is a combination flow and block diagram of a process sequence of launching and deploying different types of mobility platforms according to one embodiment.

FIG. 2 is a combination flow and block diagram 30 of a process sequence of moving different types of mobility platforms 30. For example, the deposition and print mobility platforms 32 can be either a gantry-based mobility platform 34, a rover 36, a flying delta mobility platform 38, a tower platform 40 or a robotic arm platform 42. Movement on the surface of the extraterrestrial body 44 occurs by driving rotation of wheels associated with the different platforms. Further movement can occur by moving outriggers or stabilizers on the mobility platforms. Each platform can respond to transceiver input to actuate the appropriate wheel, wheels, outrigger, stabilizer, etc., to move the platform into the appropriate position. In addition, there are other drive mechanisms for moving portions of the mobility platform linked to the print head for moving the print head to the appropriate position. These portions include pulleys, wheels, trusses, spindles, cams, chains, or any other moveable member that is directly or indirectly coupled to a print head. Upon receipt of controller instructions, the controller coupled to the drive mechanisms moves the appropriate component that then redirects the print head to the appropriate position above the extraterrestrial surface or, above a previously printed, fused bead for continuing the additive 3D construction process.

Figure 3:
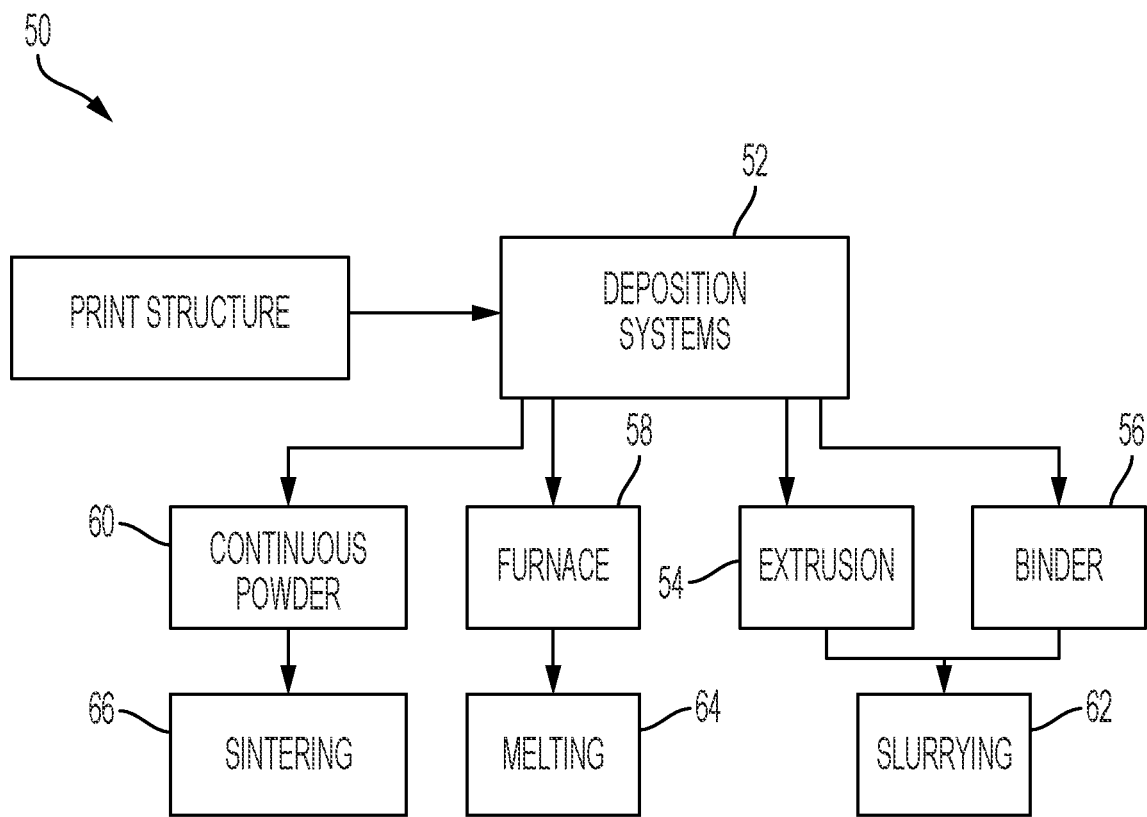
FIG. 3 is a combination flow and block diagram of depositing feedstock material to produce a 3D object using different types of deposition systems according to one embodiment.

FIG. 3 is a combination flow and block diagram 50 that illustrates the deposition of feedstock material to produce a 3D object using different types of deposition systems 52. As previously described, deposition systems 52 for 3D additive printing can include extrusion 54, binder jetting 56, fused (heated) deposition 58, and powder bed fusion 60. Both binder jetting 56 and extrusion 54 depend heavily upon access to water in creating a viscus fluid, or slurry 62. If the construction project is of large scale, then slurrying 62 is infeasible unless the extraterrestrial environment has significant amounts of native water already present. However, as noted above, this is typically not the situation. Fused deposition modeling 58 can involve heating a solid filament in a furnace, and then extruding the viscus melted material 64. In some examples, the heated mixture includes a polymer added to the regolith. However, it is preferred that the feedstock material contain as little polymer as possible and, preferably no polymers. For large scale objects, substantial amounts of polymer (greater than 50%) would have to be imported.

A more preferred embodiment that utilizes zero launch mass, and thus no imported material whatsoever, can be performed without human involvement with native materials exclusively obtained off planet, is the powder bed fusion and sintering 60 that utilizes a continuous powder of native material that is sintered 66 to convert the powder to a solid form. Sintering 66 therefore binds the powder particulate material together into a coherent solid even when the heat applied is below the powdered materials phosphorous melting temperate. The continuous powder is made of minerals and ores such as certain types of metal alloy particulate matter found on the extraterrestrial body as part of the regolith.

FIGS. 1-3 illustrate the launch, deployment, harvesting, processing and depositing mechanisms used in the production of an object using the locally available in-situ resources (ISRU). The mission controller can be located at least in part on Earth and through communication controls operation of the 3D printing operation, a single object or multiple objects can be formed off planet without any human involvement. The mission controller operates through command and controls software to design, via CAM, printing of the object. A power system can apply the necessary power from a power source located entirely on the extraterrestrial body so that sintering power and heating power of the collected feedstock material can occur.

Figure 4:
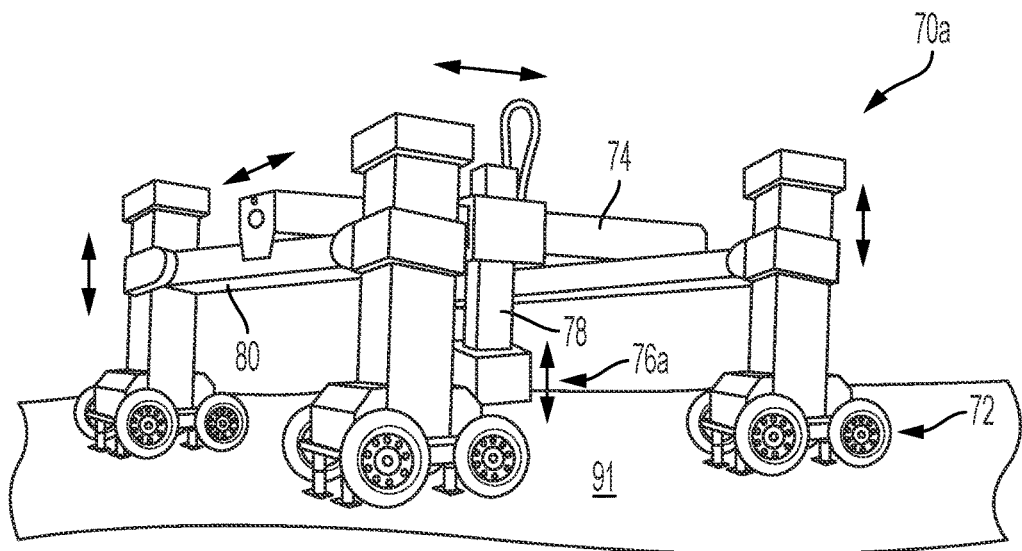
FIG. 4 is a perspective view of a mobility platform with a print head mounted on a gantry that moves between vertical towers according to one embodiment.

FIG. 4 illustrates a mobility platform 70a having wheels or tracks 72 configured to move the mobility platform 70a along the surface 91 of an extraterrestrial body. The mobility platform 70a further includes a gantry 74 on which a print head 76a is moveable. As shown, print head 76a can move in the vertical or z-direction upon a vertical support arm 78. The vertical support arm 78 can move horizontally in either the x or y directions (or in the x/y plane at angles between orthogonal x and y axes) upon gantry 74. Gantry 74 can move in the x and y directions upon a horizontal support arm 80.

Mobility platform 70a, according to the embodiment shown in FIG. 4 is in a deployed configuration as opposed to being in a transport configuration. In a transport configuration, the gantry-based mobility platform 70a can collapse upon itself so it can be easily configured on a lander and launched. Preferably, the transported configuration can be converted to a deployed configuration once at the extraterrestrial site without any human intervention. Any reconfiguration can take place from mission control on Earth, rather than from a human at the extraterrestrial site.

Figures 5, 6:
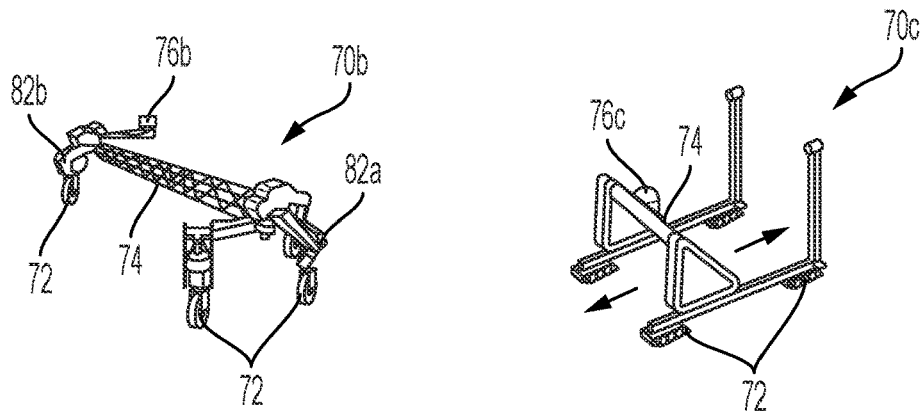
FIG. 5 is a perspective view of a mobility platform with a print head mounted on one or both ends of a gantry that moves on cross beams between wheels according to one embodiment.
FIG. 6 is a perspective view of a mobility platform with a print head mounted on an angled gantry that moves on collapsible rails according to one embodiment.

FIG. 5 illustrates another type of gantry-based mobility platform 70b. Mobility platform 70b, according to the alternative embodiment, includes a gantry 74 that links to mobile portions 82a and 82b, with a print head 76b arranged on a boom on at least one of the moveable portions 82a or 82b. The moveable portions 82a and 82b can move independent of each other on the extraterrestrial surface, each having wheels 72. Similar to mobility platform 70a, mobility platform 70b is shown in a deployed configuration. However, it is readily understood that gantry 74, along with the vertical support members can attach to wheels 72 and be folded in the configured launch mode and transported to the extraterrestrial body before being configured into a deployed arrangement for printing.

FIG. 6 illustrates an angled gantry mobility platform 70c being deployed, or unfolded, for printing. Angled gantry 70c includes wheels or tracks 72 on which the horizontal support member, or angled gantry 74 can move. The movement in shown along the directions of the x and/or y dimensions along arrows shown. A print head 76c is mounted to gantry 74, and can be moved in the vertical, or z directions relative to gantry 74, and can also be moved along the upper horizontal member of gantry 74.

Figure 7:
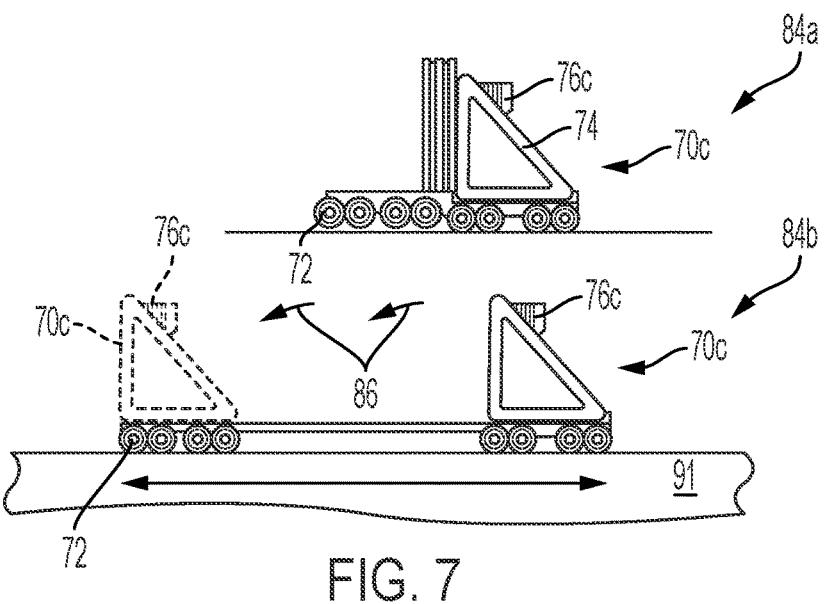
FIG. 7 is a perspective view of a mobility platform with a print head mounted on an angled gantry that is shown in a collapsed transport mode and a non-collapsed print mode according to one embodiment.

The horizontal pair of tracks can be folded upon each other in the transport mode, and unfolded in the deployment mode. FIGS. 6 and 7 illustrate the two different configurations. FIG. 6 illustrates the horizontal tracks being folded downward from a transport mode to a deployment, or print mode. That illustration between transmit and deployment (i.e., print) mode is better shown in FIG. 7 between the collapsible transmit mode 84a and the expanded, deployed and print mode configuration 84b. The transmit mode 84a illustrates the horizontal tracks collapse upon each other and against the angled gantry 74. By collapsing the horizontal support members into a more condensed profile, the gantry-based mobility platform 70c can be more easily loaded onto the lander and launched from Earth to the extraterrestrial body. Once landed, the mobility platform 70c can be expanded as shown by the arrows 86, and then the mobility platform 70c in the configuration of 84b is moved to the print site on the extraterrestrial surface 91. As further shown in the print configuration 84b, the angled gantry 74 can move along the tracks from one end near, for example, one set of wheels 72 to the other end near the opposing set of wheels 72 depending on the desired build volume of the object being built. If the build volume is large, then the mobility platform 70c can move the entire length along the tracks. However, if the build volume is smaller, then the mobility platform 70c need only move part way down the track, possibly between the spaced set of wheels 72. The print head 76c can be moved on the angled gantry 74 in a direction orthogonal to a longitudinal axis of the rails.

Figure 8:
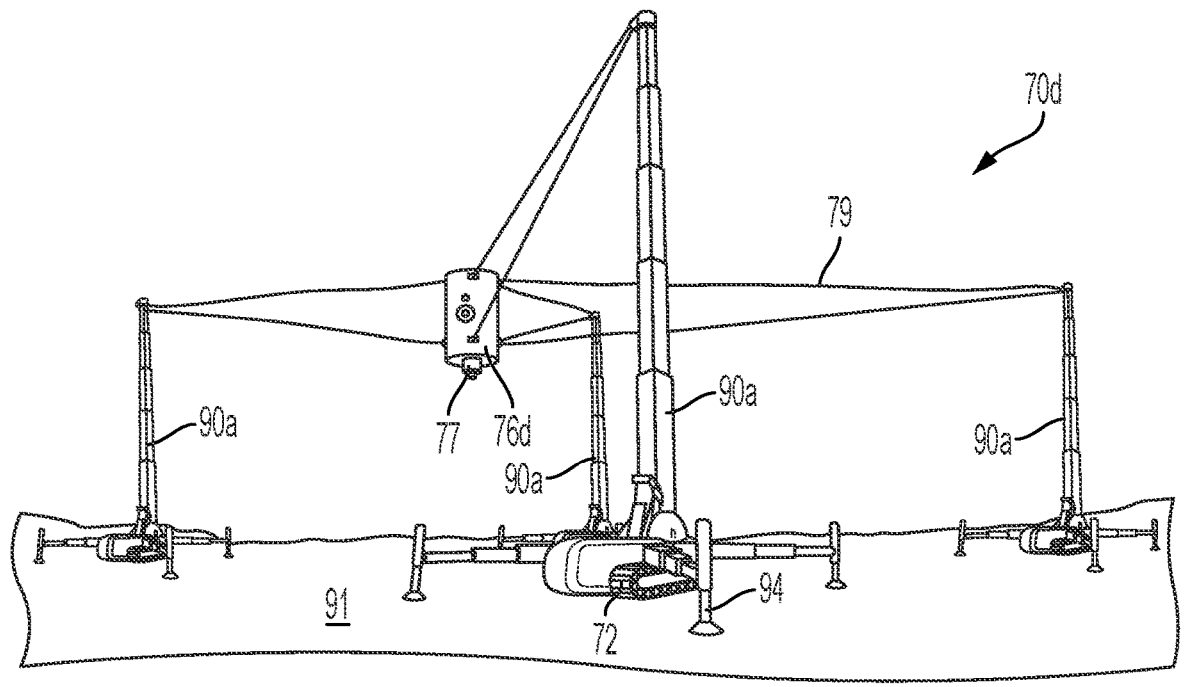
FIG. 8 is a perspective view of a mobility platform with a print head mounted on a set of cables that extend or contract on a vertically extending tower according to a flying delta arrangement according to one embodiment.

FIG. 8 illustrates a print head 76d suspended between vertical support members 90a that are spaced around the extraterrestrial construction site. The support members 90a can be secured by outriggers after they are moved to the site via wheels or tracks. The support members 90a thereby travel to the site, and then are deployed with outriggers via mobile vehicles on tracks. The mobility platform 70*d* is based on a flying delta style construction system that can deliver a large mass or volume from the printing head 76*d* through extrusion outlet 77. Mobility platform 70*d* has a fairly large number of non-redundant fail points but is better in producing large scale structures or objects. The cables 79 can be extended or retracted onto vertical support members 90*a* to thereby move print head 76*d* in three directions depending on which cable is retracted in the series of three or more cables. In the embodiment of FIG. 8, mobility platform 70*d* is shown having four vertical support members, each with an extendable or retractable set of cables coupled to the upper and lower attachment points of print head 76*d*. Depending on which cable is retracted or extended, the print head 76*d* can move in the x, y and/or z directions above the extraterrestrial surface 91.

Figure 9:
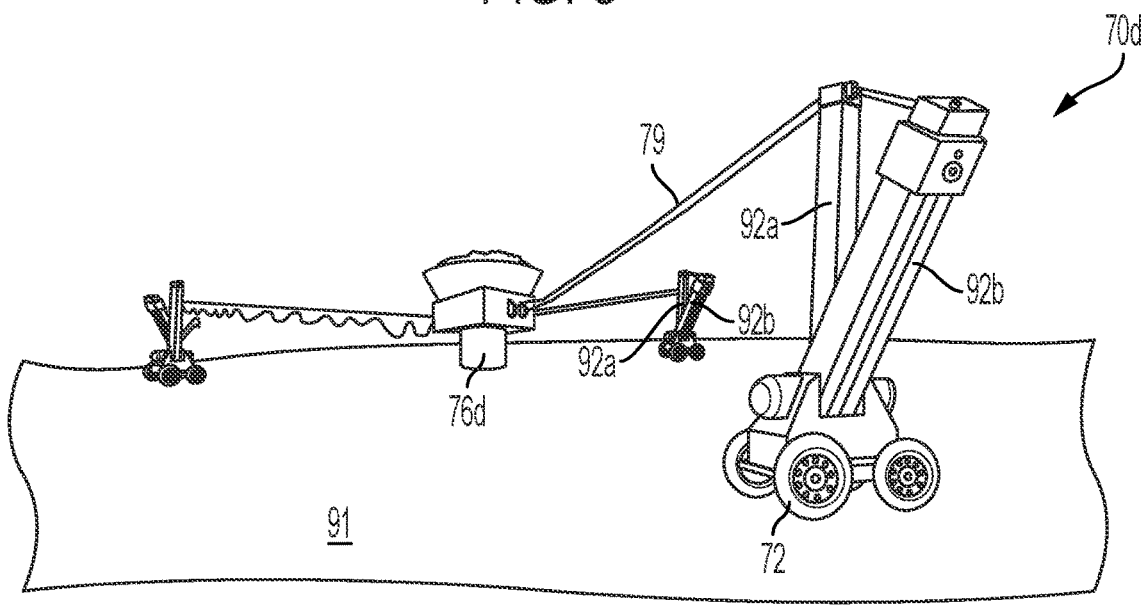
FIG. 9 is a perspective view of a mobility platform with a print head mounted on a set of cables that extend or contract on two substantially vertically extending towers according to another flying delta arrangement according to one embodiment.

FIG. 9 illustrates an alternative embodiment of a flying delta mobility platform 70*d*. However, instead of a single vertical support member, FIG. 9 illustrates two vertical support members 92*a* and 92*b* at each of three or more vertical support members coupled by cables 79 to attachment points on print head 76*d*. By using two vertical support members 92*a*, 92*b*, a pair of angled trusses provide greater vertical and horizontal strength. One angled truss can extend vertically to draw the line tight as it travels downward at the secure point, and loosens the line as it travels upward at the secure point. Tightening or loosening the line will draw the print head 76*d* upward or downward in the x, y and/or z dimensions over the build site on the extraterrestrial surface 91. The entire mobility platform 70*d* can be moved to the construction site by wheels or tracks 72 as shown in FIGS. 8 and 9, and secured at that site by outriggers 94. The vertical supports 90*a* and 92*a*, and 92*b* can be placed in a low profile configuration for transport, either connected to cables or not. Once deployed, the cables can be connected and the vertical supports extended upright and moved to the construction site in the print mode.

Figure 10:
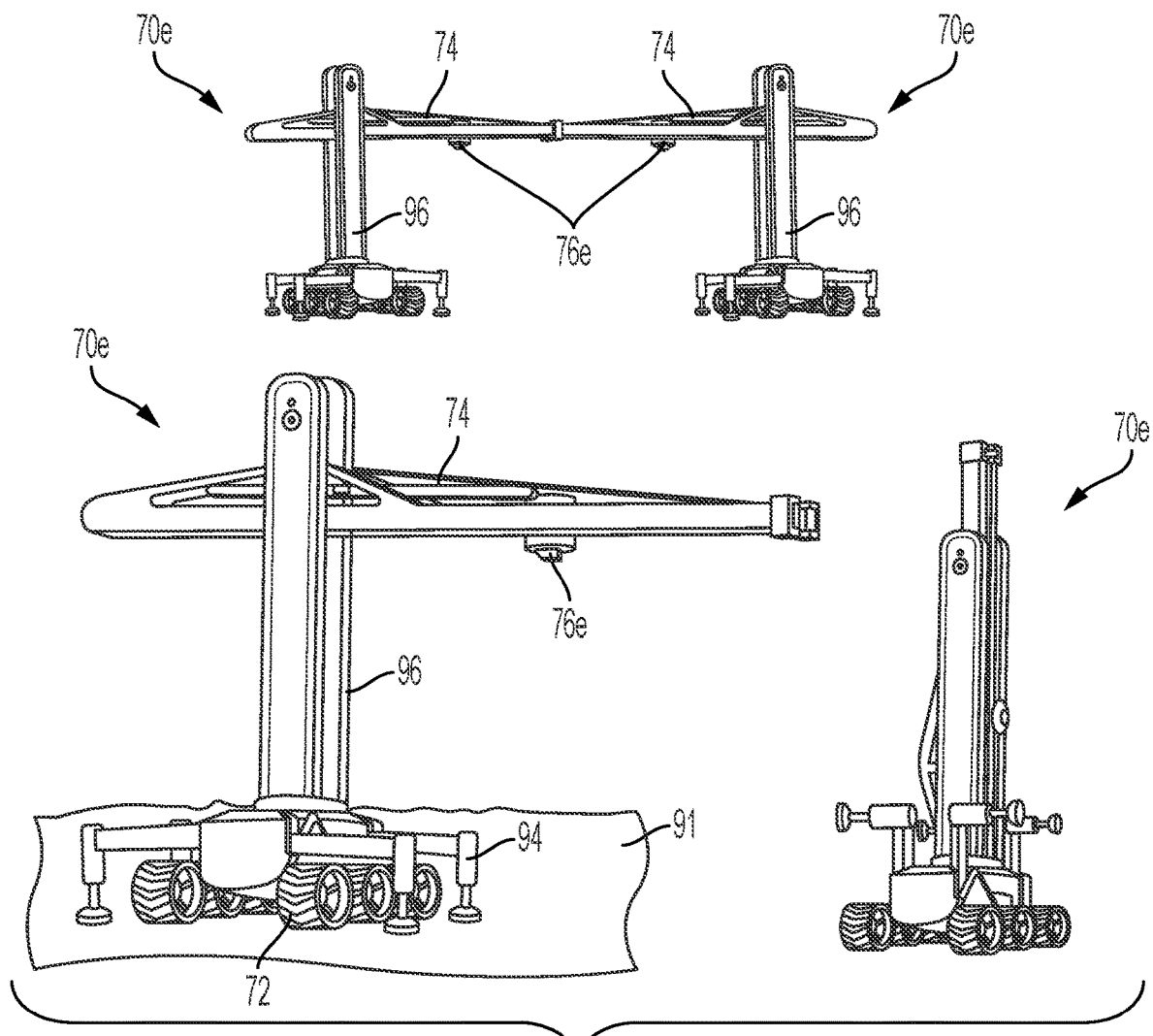
FIG. 10 is perspective view of a mobility platform with a print head mounted to a distal end of a gantry coupled to a single vertical, and moveable tower according to one embodiment.

FIG. 10 illustrates a rolling tower type mobility platform 70*e*. Similar to the gantry or flying delta arrangement, a vertical support 96 is shown. However, in the embodiment in FIG. 10, only a single vertical support is provided with a gantry 74 that moves up and down in a vertical direction within a single vertical support 96. The single vertical support of the rolling tower embodiment shown in FIG. 10 is mounted to a mobile platform on which wheels 72 can rotate and outriggers 94 can be extended outward and downward onto the extraterrestrial surface. Outriggers 94 maintain stability of the rolling tower once the mobility platform 70*e* is configured at the construction site. The outriggers are deployed to stabilize the vertical support in place. A substantially horizontal gantry boom 74 extends from the vertical support 96, possibly with a counterweight on one end opposite the print head 76*e* on the other end.

For transport to and from the extraterrestrial body, or during the idle configuration for storage, the horizontal gantry boom 74 can fold onto and into the vertical support 96 so that the overall construction system is streamlined along a single access, with the mobile platform removable from the folded horizontal boom and vertical support. The transport mode is shown on the right hand side of FIG. 11. Extraterrestrial materials can be loaded at the base of the vertical support 96, after deployment thereof, and an internal material elevator can deliver the beneficial material feedstock to the horizontal conveyance system and to the print head 76*e* at possibly a distal end of the horizontal conveyance system. The rolling tower mobility platform 70*e* has limited reach, and the hydraulic fluids and lubricants are limited in the extraterrestrial environments thereby requiring covers and dust boots to be configured in a sealed arrangement around any movement point, similar to any of the other mobility platforms 70 having movement points that could be susceptible to the extraterrestrial environment. Such environment includes fine dust particles, radiation and extreme temperature fluctuations, as well as vibration from shakes, quakes, or solar wind.

As show in the upper portion of FIG. 10, the two or more rolling tower mobility platforms 70*e* can be linked together at their distal ends of the boom gantrys 74. Linking two rolling towers together allows for possibly two print heads 76*e* at the distal ends of each boom, the rolling tower configuration can operate both booms concurrent to one another simultaneously to build, for example, two separate walls of the habitat object.

Figure 11:
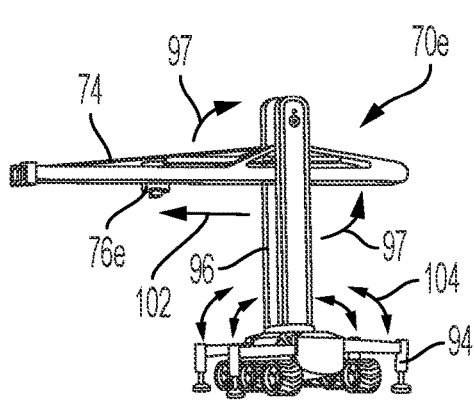
FIG. 11 is a perspective view of the mobility platform of FIG. 10 illustrating movement of the single vertical tower onto which the gantry is moveably coupled according to one embodiment.
Figure 12:
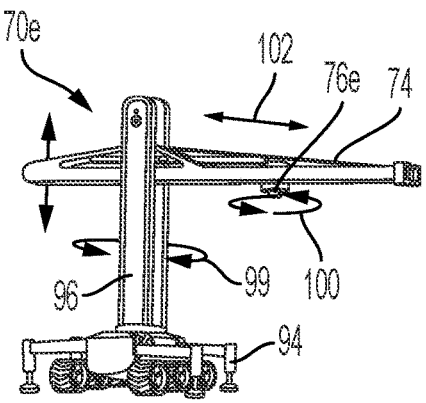
FIG. 12 is a perspective view of the mobility platform of FIG. 10 illustrating movement of the single vertical tower, the gantry moveably coupled to the tower, and the print head moveably coupled to the gantry according to one embodiment.

FIGS. 11 and 12 illustrate the different directions and axis of movement for the rolling tower mobility platform 70*e*. The boom gantry 74 can pivot within the vertical support member 96 as shown by arrows 97. Moreover, the vertical support member 96 can rotate about its own central axis as shown by arrow 99. Still further, print head 76*e* can rotate 100, and can move from the proximal position to a distal position as show by arrow 102. The outriggers can be folded up for transport 104. It is worthwhile to note that the vertical support 96 can be mounted to a track that extends between a set of spaced wheels to make fine adjustments in the x and/or y dimensions, and the tracks can be secured also by outriggers 94.

Figure 13:
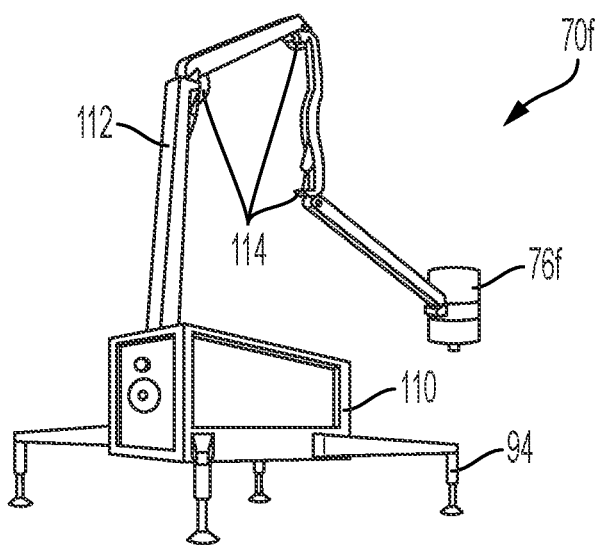
FIG. 13 is a perspective view of a mobility platform with a print head mounted on a reciprocating arm that is moveable on a base that can include wheels and outrigger stabilizers to stabilize movement of the arm according to one embodiment.

FIG. 13 illustrates a mobile base secured to outriggers 94, all of which is used to support a robotic arm 112 of a scorpion type mobility platform 70*f*. At the distal end of the robotic arm 112 is the print head 76*f* Print head 76*f* can move in three directions above the extraterrestrial surface via pivot points on the robotic arm 112, as well as pivot points where the robotic arm 112 couples to the mobility base 110. The pivot points are controlled to move the print head 76*f*, and specifically the outlet of the print head over the structure or object being printed in three dimensions. FIG. 13 illustrates three pivot points 114. However, it is understood that less than three pivot points, or more than three pivot points 114 can be deployed on not only the robotic arm 112, but also on the mobility base 110. According to an alternative embodiment, instead of placing the pivot points 114 on the boom arm of the robotic arm, the pivot points can be placed on the legs of the support body 110. Accordingly, the support body is moveable in the x and/or y directions parallel to the horizontal plane of the extraterrestrial surface. The boom arm can simply be a platform on which the print head 76*f* is mounted above the moveable legs, each having a pivot point. The platform containing a print head 76*f* can further move in the z directions orthogonal to the horizontal x/y plane. As the layers are applied, the print head 76*f* moves in the x and/or y directions, and the print head 76*f* moves in the z direction by extending the legs on the bottom platform of the mobile drive unit 110.

Figure 14A:
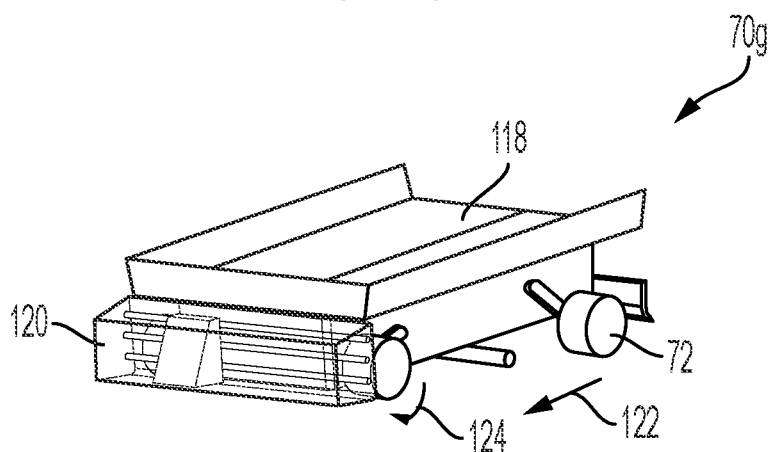
FIGS. 14a and 14b is a perspective view of a mobility platform with a rover having a bed for receiving harvested feedstock materials and also having an opening for delivering the collected materials to a print head according to one embodiment.
Figure 14B:
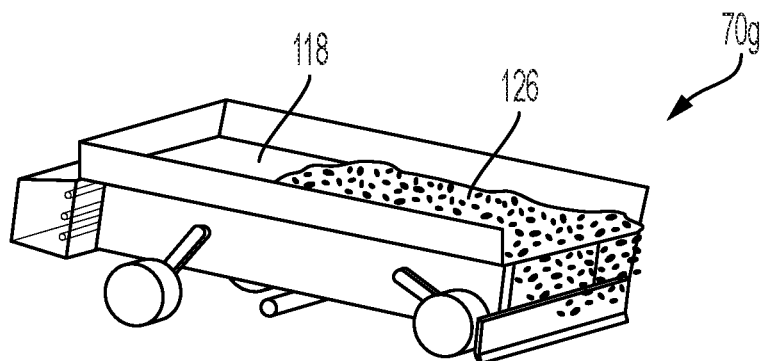

Turning now to FIGS. 14*a* and 14*b*, a less complex material delivery system than those previously shown is illustrated as a rover mobility platform 70*g* having a bed 118 that can travel to the building site and can deliver the material directly to the site without having to harvest and thereafter extrude the building material. The rover delivery system 70*g* proves useful in building large scale structures, such as roads and the like. The rover mobility platform 70*g* shown in FIG. 14*a* can be tilted downward to scoop up or harvest material from the surface from the extraterrestrial body. The scooping apparatus 120 at the front end of bed 118 is open to the bed 118, and contains paddles or rotatable scoops that rotate the opposite direction in which mobility platform 70g moves via arrow 122. Rotation of the scoops is shown by arrow 124. As the scoops or paddles rotate, the material is fed into one end of bed 118, as shown in FIG. 14a. Once the materials are gathered, bed 118 can then pivot backward as shown in FIG. 14b so that material 126 is delivered at the back of bed 118. The delivery can occur via a print head, whereby material 126 is channeled into a print head, if desired. Alternately, the material can simply be deposited at some other site remote from the site in which the material was harvested. That material can then be applied on a layer-by-layer basis to, for example, a roadway or flat planar surface that would be built upward in a z-direction. The rover-type mobility platform 70g is useful in building large scale structures even beyond roads and the like. However, the rover 70g is in constant close contact with dust and fine particles on the extraterrestrial surface possibly causing greater number of breakdowns. However, the wheels 72, and their associated bearings are protected from the dust using dust covers and the like. The harvester 120 can, however, create substantial amount of dust, also requiring dust covers and similar protective covers surrounding the rotatable scoops. Each of the mobility platforms 70a-70g have their benefits and detriments. Yet each have protective covers placed on appropriate movement mechanisms to protect against any environment in which they are subjected. The various structures and components of the mobility platforms 70a-70g are made of a material that has good thermal and radiation resistance, yet stable enough to withstand significant wind, asteroid and quake forces often encountered on the extraterrestrial body.

FIGS. 15a, 15b and 15c illustrate different form factors, or objects, constructed from 3D additive construction processes on the extraterrestrial body. The different objects that can be 3D formed include landing pads, berms and ground support structures 130 that can surround a launch site or a landing site of a launcher 132. Another type of additively constructed object includes roads 134 shown in FIG. 15b. Moreover, a habitat 136 can be additively formed as shown in FIG. 15c. The 3D constructed habitat 136 can be one structure, or multiple structures possibly linked together to form a larger habitat object 136. A gantry-based mobility platform 70 can be used to construct the object 130, 134 or 136. The gantry mobility platform 70 can move about and above the object, and can comprise a print head 76 mounted on gantry mobility platform 70. The mobility platform 70 can be moved to the construction site and deployed in a print mode according to any of the features described above. A roadway 134 is preferably formed using a rover mobility platform 70g shown in FIGS. 14a and 14b.

FIG. 16 illustrates different forms of additive construction systems, each comprising a mobility platform and a print head 140a, 140b and 140c launched from Earth to an extraterrestrial body 142. Prior to launch, the constructions systems, and specifically the mobility platforms and print heads are configured on the land and launched to body 142, controlled by a mission controller on Earth. The different types of construction systems and print heads 140a, 140b and 140c will be described further below. However, print head 140a is an example of an electric furnace that extrudes molten material feedstock. Print head 140b is illustrative of a laser sintering print head for sintering continuous layers of powder material in an additive process. Print head 140c is an example of an extrusion print head with a binder agent 144 applied to the extrusion apparatus 140c. As noted previously, 3D additive printing can include extrusion, fused deposition, binder jetting, and powder bed fusion. Print head 140a can be used for fused deposition employing an electric furnace to extrude molten feedstock material. Print head 140b can be used for powder bed fusion, using laser sintering. Print head 140c can be used for binder jetting, with the binder agent 144 being either imported or locally harvested. Extrusion process of extrusion apparatus 140c, however, involves creating a viscous fluid pumped through a nozzle, and the slurry-based water needed for extrusion is not preferred, and therefore not shown. Binder agents 144, like polymer or water, must typically be imported and therefore is not viable for the present in-situ deposition system. While extrusion and binder jetting can be used for small scale projects, large construction projects of habitats 136 of FIG. 15c is better left to fused deposition and powder bed fusion performed by print heads 140a and 140b, and not by binder jetting print heads or extrusion print heads 140c.

Figure 17:
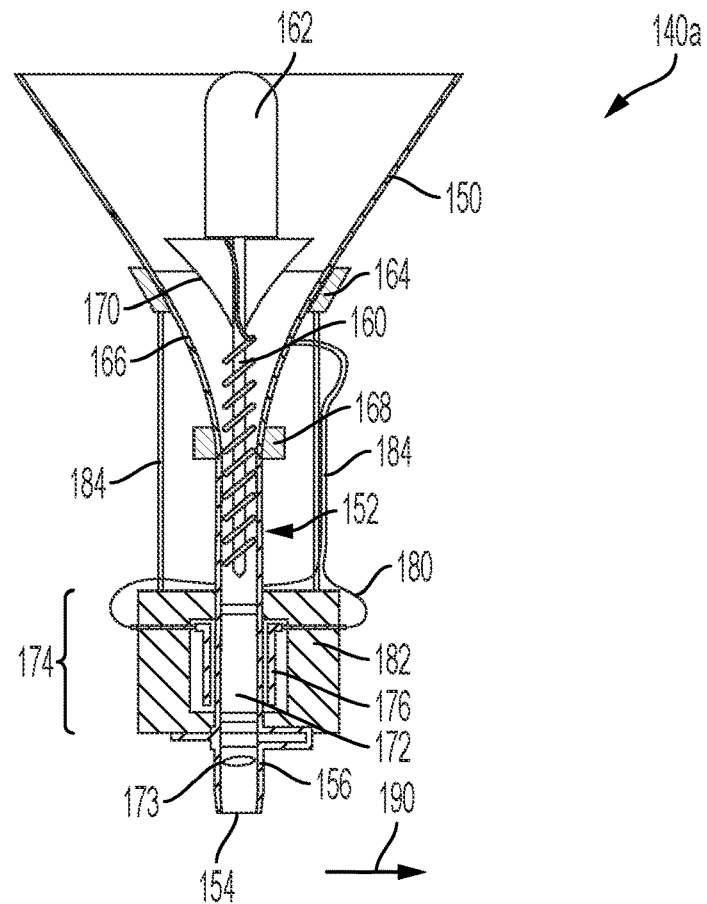
FIG. 17 is a partial cross sectional view of a heated print head apparatus mountable upon a mobility platform to extrude molten or fused materials in a continuous, additive, three-dimensional process according to one embodiment.
Figure 18:
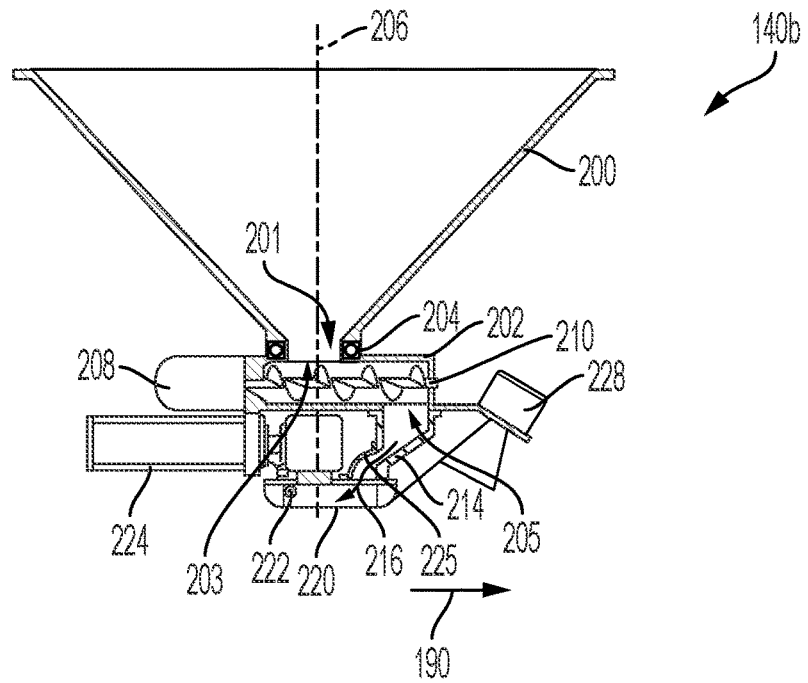
FIG. 18 is a partial cross sectional view of a sinter print head apparatus mountable upon a mobility platform to laser sinter a powder bed layer of materials in a continuous, additive, three-dimensional process according to one embodiment.

Further details of fused deposition print head 140a and powder bed fusion or sintering print head 140b is illustrated in FIGS. 17 and 18. Thus, while print heads 76a-76f are generically shown with different mobility platforms, their detailed illustration, in different forms, is illustrated as reference numerals 140a and 140b in FIGS. 17 and 18. Print head 76 is therefore the generic print head nomenclature, with specific print head types illustrated in different embodiments in FIGS. 17 and 18 as reference numerals 140a and 140b, respectively.

Turning now to FIG. 17, a fused deposition print head 140a is shown in partial cross sections. Print head 140a heats and extrudes a mixture of material as part of the additive manufacturing process. Print head 140a is intended to use in-situ resources on the extraterrestrial body, possibly with minimal (less than 3%) amounts of in-situ gathered polymer mixed with the in-situ gathered regolith. The raw materials used as feedstock materials are for the construction of large scale construction projects including, but not limited to, habitats, radiation shields, berms, walls, paved surfaces, or the like. The 3D print head 140a may be mounted to any of the mobility platforms 70a-70g noted above. The 3D print head 140a may provide an autonomous method of construction on the extraterrestrial body using only local, native resources depending on the size of the ensuing object. This approach may advantageously minimize if not eliminate launch mass of any construction materials and possibly eliminate human involvement at the local construction site. The 3D printed designs transmitted digitally from Earth and printed off-planet, to ultimately lead to the elimination of structural materials launched from Earth.

The 3D print head 140a may hold and extrude materials in a fused deposition additive manufacturing process. The extraterrestrial materials (including regolith) and other print media, possibly including small amounts of polymer and sulfur depending on the size of the object being printed, may be placed in hopper 150 through, for example, a sealable aperture at the upper extents of hopper 150. After being placed in hopper 150, the print media may travel out of hopper 150 through a lower aperture and along a heated barrel 152. The heated print media can then be extruded through an opening 154 of a nozzle 156. The extruded print media can then be deposited in a desired location or orientation upon or above the extraterrestrial surface. According to one example, the extruded print media can be deposited on a pre-existing bead of printed media. The mobility platform and specifically the print head 140a can be moved throughout the printing process to construct the desired design.

The 3D print head 140*a* may be carried by any of the mobility platforms 70*a*-70*g* to cooperatively provide three degrees of freedom. The print head 140*a* can therefore be moved or re-oriented along the x, y and/or z axes. As well as rotation about the x, y and z axes. The print head 140*a* may include a securing mechanism that secures the upper aperture or opening of hopper 150 to the mobility platform 70*a*-70*g*, and specifically to a conveyance system that conveys the in-situ materials into hopper 150. In addition to a conveyance system described further in FIG. 21, a feeding system of print head 140*a* includes a collector. The collector comprises hopper 150, auger 160 and barrel 152. As will be described below, the collector can also include a slip form and a sifter. A motor 162 protected with a shroud drives auger 160 to move the feedstock material or print media downward into barrel 152. Motor 162 can include a transmission with a control feedback loop to modulate the amount of rotation, and the torque applied to auger 160 depending upon the density or viscosity of the feedstock material being fed. Motor 162, and specifically auger 160, are designed to controllably move materials from hopper 150 through the heating zone of barrel 152.

Hopper 150 can be made of stainless steel mounted via a clamp, also made of stainless steel, to a smaller conical member 166. Similarly, the smaller conical member 166 can be mounted by another clamp 168 to barrel 152. The upper hopper plate or surface of hopper 150 can be secured to the mobility platform 70 with bolts, clamps, welds, or the like. Hopper 150 includes a hollow conical body with an upper aperture of larger diameter than the lower aperture that is secured by clamp 164. Moreover, the upper aperture of the smaller conical member 166 is of larger diameter than the lower aperture of member 166 secured to barrel 152 via clamp 168. The slope angle of the interior cavities of hopper 150 and smaller conical member 166 is greater than the angle of repose for the feedstock material inserted into hopper 150, and thus is configured to assist in promoting the movement of the print media from the upper portion of hopper 150, to the upper portion of smaller conical member 166 and finally into the upper portion of barrel 152. Hopper 150, member 166, clamps 164 and 168, as well as the auger 160 can be preferably made of stainless steel. However, other types of material that withstand the extraterrestrial environment as well as any caustic nature of the material would also be suitable. Assembly of the hopper 150 to member 166, and then to barrel 152, can be performed autonomously either on Earth or through quick-connect robotic control off-planet. Coupled to the drive shaft of auger 160 may be an agitator 170 that has one or more lateral members extending radially out from the central axis of the auger 160 yet at an angle from the rotating shaft of auger 160. The agitator 170 therefore rotates with the drive shaft and breaks up or fluidizes any of the bulk material at the bottom of the hopper 150. The outward, radially extending paddles of agitator 170 are spaced from the inside surface of hopper 150. Rotation of the drive shaft may cause rotation of agitator 170 and auger 160, causing the raw material of the print media to flow into the flutes of the auger and convey down into barrel 152. The print media may reach the heated zone on the barrel 152, specifically within the melt chamber 172 of barrel 152.

As the raw materials proceed down barrel 152, they enter a heated zone 174. The heated zone is identified as an area of increased temperature along barrel 152. The heated zone 174 may be controlled by heating elements 176. Heating elements 176 can be thermally charged by resistive heating wires 180 fed from a controller that responds to thermocouples, and the like. The thermocouples can be mounted on the heating zone 174, and the heating elements 176 can be surrounded by insulation 182. The heating zone 174, and all of the elements for heating barrel 152, can be secured both to barrel 152 as well as to upper mounting clamps 164 by support rods 184.

The heating elements 176 may be in thermal communication with a graphite extruder barrel 152 to increase the temperature of barrel 152 and melt the print media or feedstock material as it travels down the feed auger and is extruded through the opening 154 of nozzle 156. The heating controller will activate the heating elements 176 until a desired temperature is detected by the thermocouple at barrel 152. When the desired temperature is achieved, the controller may deactivate the heater 176 until a minimum temperature is detected by the thermocouple at barrel 152. A heating controller may then reactivate the heater element 176 until a desired temperature is detected. By toggling on and off the heating elements 176, the heating controller may maintain a set temperature along the heated zone 174 of barrel 152. According to one embodiment, insulation 182 may be furnace batting insulation.

Nozzle 156 may be secured to barrel 152, and opening 154 may have a diameter ranging between one quarter inch to two inches depending on the desired width of the extruded bead. Nozzle 156 can include a valve 173 to temporarily stop the flow of extruded, melted feedstock material. The valve can turn on or off autonomously to discontinue the additive process and resume the additive process. Moreover, the valve 173 can be adjusted between a fully on or fully off position to change the bead width, if desired. For example, certain objects may require a lesser bead width on the walls of a berm, rather than the walls of a habitat.

The fused deposition print head 140*a* may be adapted to utilize at least two types of feedstock material for printing. In one example, the primary raw material of the print media may be powdered basalt regolith mixed with high density polyethylene possibly imported in powder or pellet form or as a byproduct of the mission. In another embodiment, the primary raw material may be pelletized basalt glass fibers mixed with the polyethylene terephthalate glycol. The regolith is readily available on extraterrestrial surfaces and polyethylene can be synthesized from resources in space, or recycled from available emission material from packaging. The granular materials used in the print media may be available on certain planets, such as the Moon and Mars. The ensuing extruded concrete-like material is well suited for additive construction in that the material may be bound to one another using heat, or fusion. The concrete-like material with small amounts of added polymer (less than 3%), is substantially impermeable to water and also many of the extraterrestrial environmental conditions that exist at the construction site. Structures, or objects constructed from the polymer concrete material may be post processed by sintering, which removes the polymers from the structure and sinters the granular together to form a sintered, hardened structure. The inclusion of basalt to the polymer helps create the polymer concrete material, with the basalt, plastic and regolith mixed inside hopper 150 using agitator 170. The mixture of basalt, plastic and regolith may be moved down the barrel 152 and heated within the heating zone 174 to form the extruded material that hardens on the object being constructed layer-by layer. As the desired object is quite large, use of any transported material is infeasible, and therefore all materials including the polymer material must be part of the recycled product, or byproduct of the mission and thus no material used specifically and primarily for printing on the extraterrestrial body is transported from Earth.

Depending on the size of the object being additively printed, the pellets of the basalt and plastic may need to be imported or transported from Earth. However, the pellets are less than 3% by weight or mass of the entire in-situ gathered, native material feedstock. By mass, each pellet may be, for example, between 60% and 90% basalt with the balance percentage as plastic. By heating barrel 152 to about 150° C., the polymer concrete material may be extruded by nozzle 156 as a highly viscus liquid. The polymer concrete material extruded by nozzle 156 may form a layer on a flat plate. The layer may be anywhere from one quarter inch tall to one inch tall formed in the shape of a bead. The nozzle 156 may be raised off of the flat plate an additional one quarter to one inch each time it prints on top of the previous layer, or bead. In this fashion, the next layer is deposited directly on top of the previous layer. The process may be repeated until the desired completed object height is achieved. A pre heater may exist on nozzle 156 to preheat to near the melting temperature of the polymer concrete-like feedstock material just in front of the print head extrusion stream of the next layer, which may facilitate bonding between the two layers.

The pellet may include portland cement-like material such as polymer concrete, rock, sand, and thermal plastic polymer binders formed into the pellet. The thermal plastic polymer composition may be formed into 3 mm length pellets. The composition may form pellets by using a thermal plastic polymer binder. Using the pellets with an anhydrous thermal plastic binder and glass fiber reinforcements provide a sufficiently strong 3D printing resistant to temperature and radiation fluctuations on the extraterrestrial planet. The scope of a fused deposition print head model, however, is somewhat limited depending on the amount of pellet, polymer and binder being transported. In addition, the size of the collector needed to collect the imported materials as well as the native materials harvested in-situ must be relatively large, as well as the resistive heating element 176. Sufficient energy is needed to heat the heating elements 176, and to drive the feedstock materials via auger 160. The fused deposition print head 140*a*, regardless of size, must attach to an arm or gantry of the mobility platform and must be moveable over a print path or pathway. If the feedstock material and print head 140*a* is relatively large or heavy, movement of the print head and fine alignment over a previous bead can sometimes be difficult.

FIG. 18 illustrates an alternative print head 140*b*. Specifically, FIG. 18 illustrates a powder bed fusion or sintering print head 140*b* that utilizes powder feedstock material extruded from an opening in a slip form. The deposited layer can then be sintered upon a pre-existing bead across the entire upper surface of only that pre-existing bead. FIG. 18 illustrates a cross-sectional view of hopper 200 coupled to an opening within auger housing 202. A 360 degree print head pivot point clamp mechanism 204 rotatably clamps hopper 200 to auger housing 202. Clamp 204 allows hopper 200 to remain stationary, and rigidly secured to the mobility platform 70. Hopper 200 is secured at the upper surface of hopper 200, wherein hopper 200 has an upper diameter opening larger than the lower diameter opening of hopper 200. The lower diameter opening 201 of hopper 200 is centered around a central axis 206, and the upper opening 203 within auger housing 202 is also centered around central axis 206. While hopper 200 can stay stationary, the auger housing 202 can rotate up to 360 degrees around central axis 206.

The necessity for rotating the auger housing as well as other components coupled thereto is derived from the need to change the direction at which the powder material is supplied along the elongated axis of a pre-existing bead. For example, as a wall of a habitat is being constructed, the prior layer may change directions from an x direction to a y direction thereby proving the need to also change the direction at which the print head 140*b* progresses from the x direction to the y direction around the 360° print head clamp 204. A transceiver located on the extraterrestrial body receives control information from a mission controller located on Earth, and sends status information back to the mission controller. The transceiver, upon receiving control information, changes the direction of the print head 140*b*, and thus the amount of pivoting around clamp 204. For example, the auger housing 202 can rotate 90° with hopper 200 remaining in its prior position if the print direction changes from the x direction to the y direction along arrow 190 (also shown in FIG. 17). However, instead of an auger motor being within the hopper, as noted in FIG. 17, an auger motor 208 can be located below hopper 200 and shielded from any radiation or solar wind blocked by hopper 200. Auger motor 208 is out of the way of the feedstock material funneling downward to the auger 210, and can include a transmission as well as control feedback to adjust the amount of torque supplied to auger 210. Instead of auger 210 driving molten feedstock material as in print head 140*a*, auger 210 need only move gravity-fed, non-molten feedstock print media powder from auger housing upper opening 203 within auger housing 202 to lower auger housing opening 205. Thus, auger 210 comprises an auger housing 202 coupled to the hopper 200. Hopper 200 includes a hopper opening 201 at a lower opening of hopper 200 for funneling materials harvested exclusively from the extraterrestrial body, in-situ. The auger 210 includes an auger shaft configured to rotate within the auger housing 202 around the auger shaft axis that extends in the x and/or y directions depending upon the direction 190 at which the print is to occur. The auger housing 202 includes an upper auger housing opening 203 and a lower auger housing opening 205. The upper housing opening 203 is aligned directly below the hopper opening 201 and aligned radially around the central axis 206 to receive the harvested materials.

As the auger 210 rotates by auger motor 208, the materials fed from hopper opening 201 move from the upper auger housing opening 203 and fall downward through the lower auger housing opening 205. The motor 208 does not interfere with the feeding of the print media downward to the hopper opening 201. As the materials fall downward, the impact upon a vibration sifter 214 distributes the materials of particle size less than preferably 1000 microns, and more preferably less than 100 microns, and yet further less than possibly 50 microns downward along flow path 216. Vibration sifter 214 therefore delivers the powder material along an arcuate (non-linear) flow path channel 216 that has turns and twists needed to apply the appropriate powder downward, with undesirably large particulate matter removed or sifted from the powder flow. The vibration sifter 214 can reciprocate upward a spaced distance from the upper channel surface surrounding the sintering housing 225. That spaced distance is preferably around 100 microns, and the sifter 214 can break apart any particular matter greater than 100 microns by its vibration against the upper channel surface formed by the lower portion of the sintering housing 225.

By keeping the flow path non-laminar and non-linear, but with curved lateral and downward flow, the appropriate sized powder will be placed onto the upper surface of the pre-existing bead, and within the confines of a slip form 220. An adjustable height compression roller 222 can be used to frictionally engage with the upper surface of the powder applied to the pre-existing bead upper layer. The compression roller stops the downward movement of the powder bed sintering print head 140b so as not to damage the upper surface of the pre-existing bead as the print head 140b travels along arrow 190. Also, as print head 140b travels along arrow 190, the flow of powder along channel 216 is dispersed on the upper surface of the pre-exiting bead while laser 224 emits radiation to a scanning mirror within a laser housing 225, and then eventually downward to the dispersed powder.

Print head 140b therefore uses a laser 224 to sinter a bed, or layer of additive material that is divisible at the 100 micron scale (preferably approximately 50 microns in diameter) and constrain to particular bulk diameters within the confines of the width of a pre-existing bead, for example. Processes requiring powder have limitations on the shape and size that can be put in the system for use. Homogeneity may also be a requirement for powder-based additive manufacturing devices. The materials collected in-situ must therefore be collected by hopper 200 and auger 210, but must also be conditioned from vibration sifter 214 depending on the material size or particulate size of the powder. The powder is collected exclusively from the extraterrestrial body. The powder can be collected entirely from the native site, with possibly less than 3% taken from manmade sources collected entirely from the extraterrestrial body. Such manmade sources include space debris or manmade debris. It is necessary that the material all be collected exclusively on the extraterrestrial body. Although less than optimal, some materials can be imported, if the fused deposition print head 140a is used. If the powder bed fusion sintering print head 140b is used, however, all materials are collected exclusively on the extraterrestrial body and no materials are imported.

In the powder based environment, fabrication occurs in layers using loose powder delivered from hopper 200 and auger 210, without having to drive dense and highly viscus fluids as in the fused deposition print head 140a. After each layer of powder is applied to the previous layer, the fusible feedstock material may be fused with heat (i.e. sintering) via laser 224. Sintering occurs after each layer is deposited, by passing a heat radiating device, or laser, over each layer. In some instances, a powder spreading roller can be applied to spread the powder over the pre-existing layer before being sintered. In the print head 140b of FIG. 18, the powder is naturally spread via channel 220 across the width of the channel which matches the width of the prior layer bead. The mobility platform driven by the CAD software ensures the lower auger housing opening 205 is aligned over yet slightly offset from, the pre-existing bead, and moves the print head 140b in the direction 190, in the x and/or y direction. After each layer is printed, the mobility platform moves the print head 140b in the z direction upward until the 3D structure or object is completed.

Mounted to the front of print head 140b is a microwave pre-warmer 228. The pre-warmer 228 heats the pre-existing bead surface to a level that does not melt that bead but enhances the binding of the deposited material to that heated, pre-existing bead. The temperature at which the microwave pre-warmer 228 heats the pre-existing bead preferably exceeds 1000° C. The RF electromagnetic waves emitted by the microwave pre-warmer 228 are coupled to the materials and converted to heat. The microwave pre-heater 228 can utilize microwave wave guides or funnels to direct the microwave energy, for example, at a frequency of 900 MHz to 100 GHz, or more preferably between 2.35 to 2.45 GHz. Laser emitter 224 produces any sintering temperature needed to harden, or fuse the powder and, depending on the type of powder used, the sintering temperature of the laser emitter 224 can exceed 1300° C., and more preferably can exceed 1500° C. The chosen temperature does not melt the powder but instead sinters, hardens or fuses the powder above 1100° C.

As shown in FIG. 18, a collector comprising hopper 200, auger 210 and slip form 220 is provided. The hopper 200 collects the harvested material, and the auger 210 delivers the harvested material to a lower auger housing opening 205, whereby slip form 220 maintains the collection on the upper surface of the pre-existing bead. The collector further includes a vibration sifter 214. Sifter 214 vibrates and delivers material having particles less than approximately 100 microns, and preferably less than 50 microns in diameter. The conditioner comprises the heating microwave 228 and the sintering laser emitter 224. The heating microwave 228 heats the pre-existing bead formed over the surface of the extraterrestrial body. The sintering laser 224 is configured for sintering across the width of a layer of the materials applied upon the pre-existing bead heated by the heating microwave 228. The print head 140b also includes an extruder coupled to the conditioner for placing the conditioned materials over the surface of the extraterrestrial body depending on the control information received from the mission controller. The extruder or opening is in the upper surface of the slip form directly beneath the lower auger housing opening 205, and specifically within the channel 216. Thus, instead of the extruder extruding molten or melted feedstock material, the extruder of print head 140b is simply an opening that extrudes powder fed through that opening and into the confines of slip form 220.

Turning now to FIGS. 19a and 19b, a back and front view of print head 140b is shown. The back view in FIG. 19a illustrates the output 230 from sintering laser 224. The output 230 is focused downward upon the powder bed of deposited materials 232 applied across the upper surface of the pre-existing bead 234. The powder bed of materials 232 is applied between the confines of the parallel spaced opposed lateral planar members 236a and 236b of slip form 220. Thus, the parallel spaced planar members 236a and 236b extend on corresponding lateral surfaces of the pre-existing bead 234 so that the opening within the slip form 220 causes material 232 to exist only on the upper surface of the pre-existing bead 234, and not fall off the pre-existing bead 234 and waste the sintering powder.

FIG. 19b illustrates a front view of print head 140b, and specifically shows the microwave pre-heater 228 mounted to a front portion of print head 140b. Pre-heater 228 directs microwave energy downward upon the pre-existing bead 234 prior to any layer or bed of material being applied. Thus, pre-heater 228 can direct thermal energy 240 downward upon the pre-existing bead 234 prior to the application of powder 232 (shown in FIG. 19a), and prior to a slip form 220 existing over the pre-existing bead 234. A conveyance delivery system 242 can be arranged above the hopper 200 in order to bring in-situ feedstock material from a harvest site to the opening at the top of hopper 200, as will be further illustrated in FIG. 21.

Turning now to FIG. 20, hopper 200 is shown having a conical shaped inner surface. Hopper 200 includes a hopper opening 203 at a lower portion of hopper 200 for funneling the materials harvested from the extraterrestrial body. FIG.

20 also illustrates an auger housing 202 that includes an upper auger housing opening 203 that extends through an upper portion of auger housing 202. A lower auger housing opening 205 extends through a lower portion of auger housing 202. As shown, the upper housing opening 203 is aligned directly below the hopper opening 201. Also shown is a slip form 220 comprising an upper planar member having a slip form opening 244 that is aligned directly below the lower auger housing opening 205 to apply a layer of material emitted from the hopper via the auger upon a pre-existing bead formed over the surface of the extraterrestrial body. The upper planar member 246 of slip form 220 is coupled to the auger housing 202, and extends above the applied layer of the materials with parallel opposed lateral planar members 236a and 236b spaced from each other. The parallel opposed lateral planar members 236a and 236b extend downward from the upper planar surface 246 substantially equal to a width of the pre-existing bead 234 (shown in FIGS. 19a and 19b). The opposed lateral planar members 236a and 236b extend at equal lengths below a portion of the pre-existing bead 234 as shown in FIG. 19a.

FIG. 21 illustrates a side view of print head 140b moving in direction 190 across a pre-existing bead 234. Also shown is a conveyance system, or channel that forwards pre-conditioned feedstock material 231 into hopper 200. The dry conveyance system 242 can gravity feed a pre-conditioned in-situ material onto a pre-existing, fused bead 234. The delivery mechanism can be fully autonomous, which gathers the harvested material at another site and through a conveyor system sends that feedstock material 231 into hopper 200 without any human intervention. Depending upon sensor readings taken within hopper 200, the flow amount can be adjusted to maintain the appropriate quantity of materials 231 within hopper 200 at any given time. As shown, the pre-conditioned material 231 is sent downward and laterally via an auger within channel 216, where it disperses across the upper surface of the pre-existing bead 234. Pre-heater 228 heats the surface of pre-existing bead 234, and laser 224 sinters the material extending downward along channel 216 onto the upper surface and across the width of pre-existing bead 234. Print head 140b can move up or down upon roller 222 in the z-direction 243. After conditioning (i.e. sintering) a layer 235 is fuse hardened upon pre-existing layer 234 in the additive 3D construction process. The openings between hopper 200, auger housing 202 and slip ring 220 are purposefully offset to create a non-linear spreading effect of the pre-conditioned material 231 across the entire bead width as fine particulate matter that can then be readily and easily sintered across that entire width according to a preferred embodiment hereof.

As used herein, "about," "approximately" and "substantially" are understood to refer to numbers in a range of numerals, for example the range of −10% to +10% of the referenced number, preferably −5% to +5% of the referenced number, more preferably −1% to +1% of the referenced number, most preferably −0.1% to +0.1% of the referenced number.

Furthermore, all numerical ranges herein should be understood to include all integers, whole or fractions, within the range. Moreover, these numerical ranges should be construed as providing support for a claim directed to any number or subset of numbers in that range. As used herein and in the appended claims, the singular form of a word includes the plural, unless the context clearly dictates otherwise. Thus, the references "a," "an" and "the" are generally inclusive of the plurals of the respective terms.

Without further elaboration, it is believed that one skilled in the art can use the preceding description to utilize the claimed inventions to their fullest extent. The examples and aspects disclosed herein are to be construed as merely illustrative and not a limitation of the scope of the present disclosure in any way. It will be apparent to those having skill in the art that changes may be made to the details of the above-described examples without departing from the underlying principles discussed. In other words, various modifications and improvements of the examples specifically disclosed in the description above are within the scope of the appended claims. For instance, any suitable combination of features of the various examples described is contemplated.

What is claimed is:

1. A system for in-situ production of a three-dimensional object on a surface of an extraterrestrial body, comprising:
   a transceiver located on the extraterrestrial body for receiving control information from a mission controller located on Earth and sending status information back to the mission controller;
   a collector coupled to the transceiver for collecting materials from the surface of the extraterrestrial body;
   a conditioner coupled to the collector for sintering and heating the collected materials, wherein the conditioner comprises:
      a heating microwave emitter coupled to a front portion of the conditioner;
      a sintering laser emitter coupled to a back portion of the conditioner;
      wherein the heating microwave is configured for heating a pre-existing bead formed over the surface of the extraterrestrial body; and
      wherein the sintering laser is configured for sintering across the width of a layer of the materials applied upon the pre-existing bead heated by the heating microwave; and
   an extruder coupled to the conditioner for placing the conditioned materials over a surface of the extraterrestrial body depending on the control information received from the mission controller.

2. The system of claim 1, wherein the collector comprises:
   a hopper for receiving the materials;
   an auger for applying the layer of the materials emitted from the hopper upon the pre-existing bead formed over the surface of the extraterrestrial body; and
   a slip form having an upper surface extending above the applied layer of the materials and having parallel opposed lateral surfaces spaced from each other substantially equal to a width of the pre-existing bead and that extend below a portion of the pre-existing bead.

3. The system of claim 2, wherein the collector further comprises:
   a vibration sifter arranged between the auger and the extruder for delivering the material having particles less than approximately 50 microns upon only an upper surface of the pre-existing bead.

4. The system of claim 1, wherein the collector, the conditioner and the extruder move in three-dimensions across a pre-existing bead formed over a surface of the extraterrestrial body.

5. The system of claim 2, wherein the extruder comprises an opening in the upper surface of the slip form beneath the hopper and the auger.

6. A system for in-situ production of a three-dimensional object on a surface of an extraterrestrial body, comprising:

a mobility platform including wheels configured to move the mobility platform along the surface of the extraterrestrial body;

a print head coupled to the mobility platform and configured to move in an x direction, a y direction and a z direction, wherein the x, y and z directions are orthogonal to each other and wherein the print head comprises:

a hopper comprising a conical shaped inner surface that radially surrounds a hopper central axis that extends in the z direction, wherein the hopper includes a hopper opening at a lower portion of the hopper for funneling materials harvested exclusively from the extraterrestrial body;

an auger comprising an auger housing coupled to the hopper and an auger shaft configured to rotate within the auger housing around the auger shaft central axis that extends in the x or y directions, wherein the auger housing includes an upper auger housing opening and a lower auger housing opening, and wherein the upper housing opening is aligned directly below the hopper opening to receive the materials;

a slip form comprising an upper planar member having a slip form opening in the upper planar member that is aligned directly below the lower auger housing opening to apply a layer of the materials emitted from the hopper via the auger upon a pre-existing bead formed over the surface of the extraterrestrial body, wherein the upper planar member is coupled to the auger housing and extends above the applied layer of the materials with parallel opposed lateral planar members spaced from each other and which extend downward from the upper planar member substantially equal to a width of the pre-existing bead, and wherein the opposed lateral planar members extend at equal lengths below a portion of the pre-existing bead; and a sintering laser emitter coupled between the auger housing and the slip form for sintering across the width of the applied layer of materials to additively deposit and sinter layers of material in the x, y and z directions.

7. The system of claim 6, further comprising a heating microwave coupled to a front portion of the auger housing, and configured to generate thermal energy upon the pre-existing bead.

8. The system of claim 7, wherein the generated thermal energy exceeds 1000 degrees C.

9. The system of claim 6, further comprising a vibration sifter arranged between the lower auger housing opening and the slip form opening.

10. The system of claim 9, wherein the vibration sifter comprises openings less than 100 microns in diameter.

11. The system of claim 9, wherein the vibration sifter comprises openings less than 50 microns in diameter.

12. The system of claim 9, wherein the mobility platform comprises a gantry on which the print head is coupled for movement between vertical towers that extend in the z direction and which move upon the wheels of the mobility platform in the x and y directions.

13. The system of claim 9, wherein the mobility platform comprises a set of cables on which the print head is coupled for movement between vertical towers that extend in the z direction and which move upon the wheels of the mobility platform in the x and y directions.

14. The system of claim 9, wherein the mobility platform comprises a gantry coupled to a single vertical tower, wherein the print head is mounted to a distal end of the gantry with the single vertical tower that extends in the z direction and which moves upon the wheels of the mobility platform in the x and y directions.

15. The system of claim 9, wherein the mobility platform comprises a reciprocating arm with a proximal end and a distal end, wherein the print head is coupled to the distal end and both the proximal and distal ends move in the x, y and z directions.

16. The system of claim 9, wherein the mobility platform comprises a rover having a bed for receiving the harvested materials and further comprises an opening within the bed for delivering the harvested materials to the hopper.

\* \* \* \* \*